(12) United States Patent
Uerdingen et al.

(10) Patent No.: US 8,841,441 B2
(45) Date of Patent: Sep. 23, 2014

(54) METHOD FOR PRODUCING REGENERATED BIOPOLYMERS AND REGENERATED PRODUCTS OBTAINED BY SAID METHOD

(75) Inventors: Eric Uerdingen, Speyer (DE); Michael Siemer, Mannheim (DE); Michael Lutz, Speyer (DE); Thomas Wisniewski, Bensheim (DE); Frank Hermanutz, Leonberg (DE); Frank Gaehr, Esslingen (DE)

(73) Assignee: BASF SE, Ludwigshafen (DE)

( * ) Notice: Subject to any disclaimer, the term of this patent is extended or adjusted under 35 U.S.C. 154(b) by 151 days.

(21) Appl. No.: 12/742,593

(22) PCT Filed: Nov. 13, 2008

(86) PCT No.: PCT/EP2008/009623
§ 371 (c)(1),
(2), (4) Date: May 12, 2010

(87) PCT Pub. No.: WO2009/062723
PCT Pub. Date: May 22, 2009

(65) Prior Publication Data
US 2010/0256352 A1    Oct. 7, 2010

(30) Foreign Application Priority Data

Nov. 14, 2007 (EP) .................................. 07022087

(51) Int. Cl.
| | | |
|---|---|---|
| C07H 1/06 | (2006.01) | |
| C07H 1/08 | (2006.01) | |
| C08B 31/00 | (2006.01) | |
| C08B 33/00 | (2006.01) | |
| C08B 35/00 | (2006.01) | |
| C08B 1/00 | (2006.01) | |

(52) U.S. Cl.
USPC .............................. 536/127; 536/56; 536/102

(58) Field of Classification Search
None
See application file for complete search history.

(56) References Cited

U.S. PATENT DOCUMENTS

| 1,943,176 A | 1/1934 | Graenacher |
| 2,339,012 A | 1/1944 | Hecht |
| 3,133,979 A * | 5/1964 | Russell .......................... 264/200 |
| 4,044,090 A * | 8/1977 | Portnoy .......................... 264/187 |
| 2008/0241536 A1 | 10/2008 | Luo et al. |
| 2008/0269477 A1 | 10/2008 | Stegmann et al. |
| 2009/0020112 A1 | 1/2009 | Massonne et al. |
| 2009/0051068 A1 | 2/2009 | Brauer et al. |

FOREIGN PATENT DOCUMENTS

| DE | 102 02 838 | 8/2003 |
| DE | 10 2006 001 773 | 4/2007 |
| EP | 1 980 653 | 10/2008 |
| WO | 03 029329 | 4/2003 |
| WO | 2007 076979 | 7/2007 |
| WO | 2007 101812 | 9/2007 |

OTHER PUBLICATIONS

Koops et al. Journal of Applied Polymer Science, 54 (3). pp. 385-404.*
Korehei, Effect of Non-Solvent on Viscoelastic and Microstructural Properties of Cellulose Acetate in a Ternary System, Thesis, The University of British Columbia, Sep. 2007, abstract only.*
International Search Report issued Apr. 17, 2009 in PCT/EP08/009623 filed Nov. 13, 2008.
Fort, D. A. et al., "Can Ionic Liquids Dissolve Wood ? Processing and Analysis of Lignocellulosic Materials With 1-n-butyl-3-methylimidazolium chloride", Green Chemistry, vol. 9, pp. 63-69, (Oct. 17, 2007) XP009095934.

* cited by examiner

*Primary Examiner* — Layla Bland
(74) *Attorney, Agent, or Firm* — Oblon, Spivak, McClelland, Maier & Neustadt, L.L.P.

(57) ABSTRACT

The invention relates to a method for producing regenerated biopolymers in the form of carbohydrates, using a solvent system that contains the biopolymers dissolved therein. The solvent system is based on a melted ionic liquid and optionally a protic solvent or a mixture thereof. The biopolymers dissolved in the solvent system are precipitated in a coagulation medium, said medium comprising a protic coagulant or a mixture of protic coagulants. The method according to the invention is characterized in that the surface tension σ of the coagulant or the mixture of coagulants is 99% to 30% of the surface tension σ of water, the surface tension being measured according to ASTM D 1590-60 at a temperature of 50° C. The method according to the invention is economical and flexible and leads to advantageous products, especially in the form of staple fibers which are especially not fibrillated and have an advantageous wet to dry strength ratio.

39 Claims, No Drawings

METHOD FOR PRODUCING REGENERATED BIOPOLYMERS AND REGENERATED PRODUCTS OBTAINED BY SAID METHOD

The invention relates to a process for the preparation of regenerated biopolymers in the form of carbohydrates, in particular of starch, cellulose and/or of derivatives of starch and cellulose, using a solution system comprising the biopolymers in dissolved form, wherein the solution system is based on a molten ionic liquid and optionally a protic solvent or a mixture thereof, the biopolymers dissolved in the solution system are precipitated in a coagulation medium, a protic coagulation agent or a mixture of protic coagulation agents being present in the coagulation medium. The invention further relates to the regenerated biopolymers obtainable thereby in the form of carbohydrates, in particular in the form of spun fibers having a wet fibrillation rating of less than or equal to 2, which are in particular non-fibrillating.

Cellulose, with a content of about $700 \times 10^9$ tonnes in the estimated biomass reserves of $1.5 \times 10^{12}$ tonnes on earth, is the most important representative in the group of organic biopolymers. The pulp which is obtained from wood and cotton and has a very high content of cellulose is currently the most important raw material basis for the production of paper, cardboard and regenerated cellulose fibers and films.

Some solvent systems have been developed in the past for processing cellulose. The viscose process, which has already been known for a long time, is still of the greatest industrial importance. In this, cellulose is first derivatized to xanthogenate and this is then dissolved in dilute sodium hydroxide solution. By regeneration in special coagulation baths, the derivatization is reversed and cellulose is made available in this way. Nevertheless, large amounts of salts and sulfur-containing waste gases are formed due to the process, and must be treated with the aid of after-treatment technologies.

In the course of the increasing environmental awareness of the last decade, developments have been forced for direct dissolving of cellulose with a lower unavoidable production of waste and undesirable emissions. The process with the solvent N-methylmorpholine N-oxide monohydrate (NMMO) has currently acquired the most important industrial significance here. Disadvantages in this process are the narrow solution window in the ternary system of NMMO, water and cellulose, the use of a solvent having an oxidizing action and the system-related fibrillation of the products produced.

Ionic liquids can serve as a substitute for conventional organic solvents. They are organic salts which melt at low temperatures (<100° C.), a novel class of solvents having a non-molecular, ionic character. Ionic liquids without substantial impurities have no measurable vapor pressure. Their polarity and therefore their property as a solvent can be adjusted according to the choice of the cation and anion.

U.S. Pat. No. 1,943,176 teaches the use of organic salts of the substance classes of N-alkyl- and N-aryl-substituted pyridinium chlorides in a mixture with nitrogen-containing bases (e.g. pyridine) for dissolving non-derivatized cellulose. Nevertheless, this invention has never acquired industrial importance. U.S. Pat. No. 2,339,012 describes dissolving of cellulose with similarly substituted pyridinium hydroxides in a mixture with water or alcohols. Here also, industrial realization appears to have failed due to a number of unfavorable industrial prerequisites for the direct dissolving of cellulose (e.g. high pressures).

By using a new class of ionic liquids, it was possible to overcome the abovementioned disadvantages. In a new development, WO 2003/029329 describes the use of ionic liquids. These are suitable as flexible solvents particularly for direct dissolving of cellulose in the absence of water and other nitrogen-containing organic bases. A disadvantage is that the use of water during preparation of the solution must be omitted. Admixing of more than 5 wt. % of water is expressly ruled out. Since the ionic liquids must be recovered virtually completely, for economic and environmental reasons, and the product consolidation takes place predominantly in an aqueous medium, this is a considerable limitation which has hitherto impeded industrial conversion. Precisely the separating off of water contents of less than 5 wt. % by distillation is industrially difficult, extremely energy-intensive and therefore economically inefficient.

The above-described disadvantages of the prior art are largely solved by the invention complex which is apparent from PCT/EP2006/012748 and which corresponds to the prior art described at the beginning. This known process is economical and environmentally friendly and provides for an advantageous regeneration of biopolymers, in particular in the form of starch, of cellulose and also of derivatives of starch and cellulose. This known technical proposal provides high manufacturing flexibility coupled with a broad range of mechanical properties. The spun fibers obtained thereby, in particular by wet spinning, are "non-fibrillating", unlike for example the lyocell fibers obtained by the NMMO process, which exhibit a pronounced fibrillar structure. In addition, the spun fibers known from PCT/EP2006/012748 have no adverse presence of sulfur, unlike the spun fibers obtained by the viscose process, and preclude an unwanted presence of copper. Water retention capacity and maximum tensile force are very satisfactory. It has emerged that it would be useful to further develop this known process such that the spun fibers obtained thereby have a satisfactorily high maximum tensile force (both wet and dry). Two examples highlight the use of ethanol or isopropanol as a coagulation bath for production of fibers. These coagulation agents are not within the purview of the invention described in what follows.

The present invention was therefore based on the object of further developing the process described above such that, in particular, the ratio of wet and dry strengths in the spun fibers obtained thereby is optimized.

This object is achieved according to the invention when the surface tension a of the protic coagulation agent or the mixture of protic coagulation agents is 99% to 30% of the surface tension a of water, each surface tension being measured in accordance with ASTM D 1590-60 at a temperature of 50° C.

It will be found preferable in the practice of the invention when the designated surface tension of the protic coagulation agent or the mixture of the coagulation agent is in the range from 99% to 35% and particularly in the range from 99% to 40%. The range from 95% to 40% will be found particularly preferable. In individual cases, it is preferable, especially in view of the preferred stretching hereinbelow, to maintain the range from 80% to 40%. The core of the invention is accordingly the selection of a protic coagulation agent which meets the above-designated general conditions relating to the surface tension a. Provided they are complied with, the above-stated object is achieved to the desired extent. When the maximum value of 99% is exceeded, the desired wet strength values are not achieved, even in the event of stretching being carried out after coagulation. At below the minimum value of 40%, it is generally the case that broken filaments occur and the fibers are not obtained with the desired portfolio of properties.

In the realm of the invention, it is in individual cases permissible—and may also be of advantage—to include protic solvents in the solution system. A person skilled in the art will adjust the amount such that the above-stated object is still achieved to the desired extent.

The term "protic solvent" is clear to the person skilled in the art. According to C. Reichardt, "Solvents and Solvent Effects in Organic Chemistry", 3rd edition, p. 82-84, 2003, Wiley-VCH, Weinheim, protic solvents comprise hydrogen atoms bonded to electronegative elements. Typical examples of these are, in addition to water, alcohols, amines (amines are to be understood as meaning aliphatic and cycloaliphatic amines), acid amides and carboxylic acids. They can be, in particular, lower alcohols, such as, in particular, methanol, ethanol, 1-propanol, 2-propanol, 1-butanol, 2-butanol, 2-methyl-1-propanol and/or 2-methyl-2-propanol, preferably methanol, ethanol, propanol and/or butanol. The particularly advantageous protic solvents furthermore include glycols, amines, acid amides and carboxylic acids, preferably glycols, such as monoethylene glycol, diethylene glycol, mono-1,2-propylene glycol, di-1,2-propylene glycol, 1,2-butylene glycol, 2,3-butylene glycol and/or glycerol, and amines, such as methylamine, ethylamine, n-propylamine, i-propylamine, n-butylamine, dimethylamine, diethylamine, di-n-propylamine, di-n-butylamine, pyrrolidine, piperidine, piperazine, N-methyl-piperazine, N-ethylpiperazine, morpholine, ethylenediamine, 1,2-propylenediamine, 1,3-propylenediamine, di-(2-cyanoethyl)amine, di-(2-amino-ethyl)amine, tri-(2-aminoethyl)amine, ethanolamine, diethanolamine, triethanolamine, propanolamine, dipropanolamine and/or tripropanolamine. The alcohols named are to be regarded as preferred. The protic solvents can be employed as a mixture, which may be of advantage in the individual case. This applies in particular to admixing of water in the case of alcohols.

The person skilled in the art is not subject to any substantial limitations with respect to the choice of ionic liquids for realizing the present invention. Ionic liquids which are particular suitable for the purposes of the invention are therefore to be described as follows:

Ionic liquids in the context of the present invention are preferably (A) salts of the general formula (I)

$$[A]^+{}_n[Y]^{n-} \qquad (I)$$

in which n represents 1, 2, 3 or 4, $[A]^+$ represents a quaternary ammonium cation, an oxonium cation, a sulfonium cation or a phosphonium cation and $[Y]^{n-}$ represents a mono-, di-, tri- or tetravalent anion;

(B) mixed salts of the general formulae (II)

$[A^1]^+[A^2]^+[Y]^{n-}$ (IIa), wherein n=2;
$[A^1]^+[A^2]^+[A^3]^+[Y]^{n-}$ (IIb), wherein n=3; or
$[A^1]^+[A^2]^+[A^3]^+[A^4]^+[Y]^{n-}$ (IIc), wherein n=4; and
wherein $[A^1]^+$, $[A^2]^+$, $[A^3]^+$ and $[A^4]^+$ independently of one another are chosen from the groups mentioned for $[A]^+$ and $[Y]^{n-}$ has the meaning mentioned under (A).

Compounds which are suitable for forming the cation $[A]^+$ of ionic liquids are known e.g. from DE 102 02 838 A1. Such compounds can thus comprise oxygen, phosphorus, sulfur or, in particular, nitrogen atoms, for example at least one nitrogen atom, preferably 1 to 10 nitrogen atoms, particularly preferably 1 to 5, very particularly preferably 1 to 3 and in particular 1 to 2 nitrogen atoms. They can optionally also comprise further hetero atoms, such as oxygen, sulfur or phosphorus atoms. The nitrogen atom is a suitable carrier of the positive charge in the cation of the ionic liquid, from which a proton or an alkyl radical can then transfer to the anion in equilibrium in order to generate an electrically neutral molecule.

In the case where the nitrogen atom is the carrier of the positive charge in the cation of the ionic liquid, in the synthesis of the ionic liquids a cation can first be generated by quaternization on the nitrogen atom of, for example, an amine or nitrogen-containing heterocyclic compound. The quaternization can be effected by alkylation of the nitrogen atom. Salts with different anions are obtained, depending on the alkylating reagent used. In cases where it is not possible for the desired anion already to be formed during the quaternization, this can be effected in a further synthesis step. Starting from, for example, an ammonium halide, the halide can be reacted with a Lewis acid, a complex anion being formed from the halide and Lewis acid. Alternatively to this, exchange of a halide ion for the desired anion is possible. This can be effected by addition of a metal salt with coagulation of the metal halide formed, via an ion exchanger or by displacement of the halide ion by a strong acid (the hydrogen halide acid being liberated). Suitable processes are described, for example, in Angew. Chem. 2000, 112, p. 3926-3945 and the literature cited therein.

Suitable alkyl radicals with which the nitrogen atom in the amines or nitrogen-containing heterocyclic compounds can be quaternized, for example, are $C_1$-$C_{18}$-alkyl, preferably $C_1$-$C_{10}$-alkyl, particularly preferably $C_1$-$C_6$-alkyl and very particularly preferably methyl. The alkyl group can be unsubstituted or can comprise one or more identical or different substituents.

Preferred compounds are those which comprise at least one five- to six-membered heterocyclic radical, in particular a five-membered heterocyclic radical, which contains at least one nitrogen atom and optionally an oxygen or sulfur atom. Compounds which are likewise particularly preferred are those which comprise at least one five- to six-membered heterocyclic radical which contains one, two or three nitrogen atoms and a sulfur or an oxygen atom, very particularly preferably those with two nitrogen atoms. Aromatic heterocyclic compounds are furthermore preferred.

Particularly preferred compounds are those which have a molecular weight of below 1,000 g/mol, very particularly preferably below 500 g/mol and in particular below 300 g/mol.

Preferred cations are furthermore those which are chosen from the compounds of the formulae (IIIa) to (IIIw)

(IIIa)

(IIIb)

(IIIc)

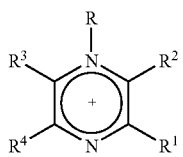 (IIId)
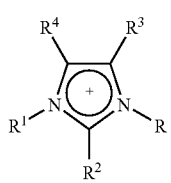 (IIIe)
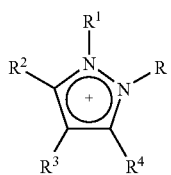 (IIIf)
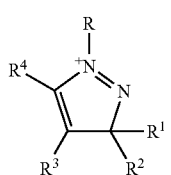 (IIIg)
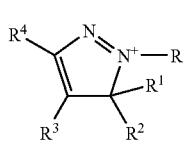 (IIIg')
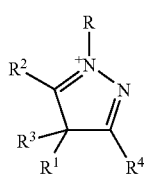 (IIIh)
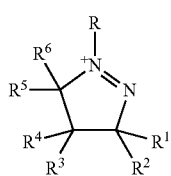 (IIIi)
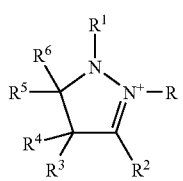 (IIIj)
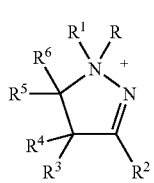 (IIIj')
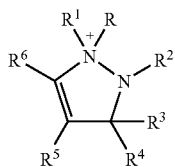 (IIIk)
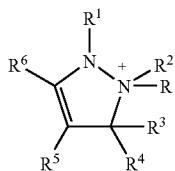 (IIIk')
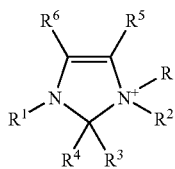 (IIIl)
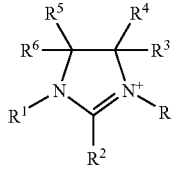 (IIIm)
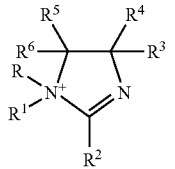 (IIIm')
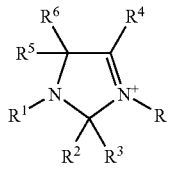 (IIIn)
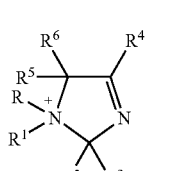 (IIIn')
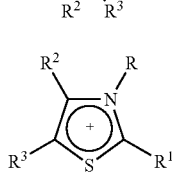 (IIIo)
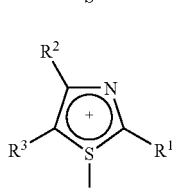 (IIIo')

-continued

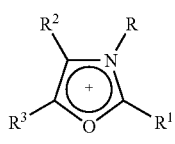
(IIIp)

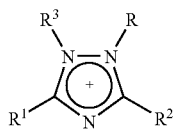
(IIIq)

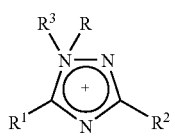
(IIIq')

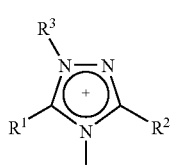
(IIIq")

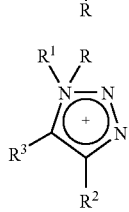
(IIIr)

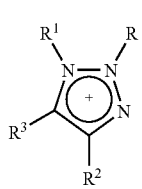
(IIIr')

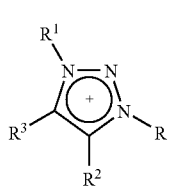
(IIIr")

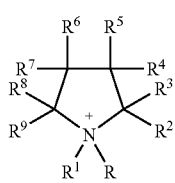
(IIIs)

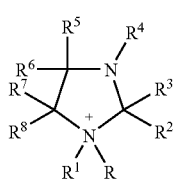
(IIIt)

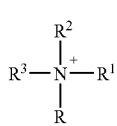
(IIIu)

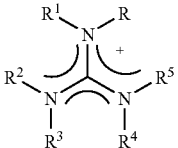
(IIIv)

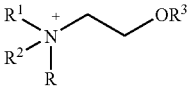
(IIIw)

and oligomers which comprise these structures.

Further suitable cations are compounds of the general formula (IIIx) and (IIIy)

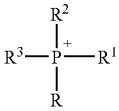
(IIIx)

(IIIy)

and oligomers which comprise these structures.

In the abovementioned formulae (IIIa) to (IIIy)

the radical R represents hydrogen, a carbon-containing organic, saturated or unsaturated, acyclic or cyclic, aliphatic, aromatic or araliphatic radical having 1 to 20 carbon atoms which is unsubstituted or interrupted or substituted by 1 to 5 hetero atoms or functional groups; and the radicals $R^1$ to $R^9$ independently of one another represent hydrogen, a sulfo group or a carbon-containing organic, saturated or unsaturated, acyclic or cyclic, aliphatic, aromatic or araliphatic radical having 1 to 20 carbon atoms which is unsubstituted or interrupted or substituted by 1 to 5 hetero atoms or functional groups, wherein the radicals $R^1$ to $R^9$ which are bonded to a carbon atom (and not to a hetero atom) in the abovementioned formulae (III) can additionally also represent halogen or a functional group; or two adjacent radicals from the series consisting of $R^1$ to $R^9$ together also represent a divalent, carbon-containing organic, saturated or unsaturated, acyclic or cyclic, aliphatic, aromatic or araliphatic radical having 1 to 30 carbon atoms which is unsubstituted or interrupted or substituted by 1 to 5 hetero atoms or functional groups.

Possible hetero atoms in the definition of the radicals R and $R^1$ to $R^9$ are in principle all hetero atoms which are capable of replacing formally a —$CH_2$—, a —CH=, a —C≡ or a =C= group. If the carbon-containing radical comprises hetero atoms, oxygen, nitrogen, sulfur, phosphorus and silicon are preferred. Preferred groups which may be mentioned in particular are —O—, —S—, —SO—, —$SO_2$—, —NR'—, —N=, —PR'—, —PR'$_2$— and —SiR'$_2$—, wherein the radicals R' are the remaining part of the carbon-containing radical. The radicals $R^1$ to $R^9$ here in the cases where these are bonded to a carbon atom (and not to a hetero atom) in the abovementioned formulae (III) can also be bonded directly via the hetero atom.

Possible functional groups are in principle all functional groups which can be bonded to a carbon atom or a hetero atom. Suitable examples which may be mentioned are —OH (hydroxyl), =O (in particular as the carbonyl group), —NH$_2$ (amino), —NHR, —NR$_2$, =NH (imino), —COOH (carboxyl), —CONH$_2$ (carboxamide), —SO$_3$H (sulfo) and —CN (cyano), in particular —OH (hydroxyl), =O (in particular as the carbonyl group), —NH$_2$ (amino), =NH (imino), —COOH (carboxyl), —CONH$_2$ (carboxamide), —SO$_3$H (sulfo) and —CN (cyano). Functional groups and hetero atoms can also be directly adjacent, so that combinations of several adjacent atoms, such as, for example, —O— (ether), —S— (thioether), —COO— (ester), —CONH— (secondary amide) or —CONR'— (tertiary amide), are also included, for example di-(C$_1$-C$_4$-alkyl)-amino, C$_1$-C$_4$-alkoxycarbonyl or C$_1$-C$_4$-alkoxy.

Halogens which may be mentioned are fluorine, chlorine, bromine and iodine.

Preferably, the radical R represents unbranched or branched C$_1$-C$_{18}$-alkyl having a total of 1 to 20 carbon atoms which is unsubstituted or substituted once to several times by hydroxyl, halogen, phenyl, cyano, C$_1$-C$_6$-alkoxycarbonyl and/or SO$_3$H, such as, for example, methyl, ethyl, 1-propyl, 2-propyl, 1-butyl, 2-butyl, 2-methyl-1-propyl, 2-methyl-2-propyl, 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, 2-hydroxyethyl, benzyl, 3-phenylpropyl, 2-cyanoethyl, 2-(methoxycarbonyl)-ethyl, 2-(ethoxycarbonyl)-ethyl, 2-(n-butoxycarbonyl)-ethyl, trifluoromethyl, di-fluoromethyl, fluoromethyl, pentafluoroethyl, heptafluoropropyl, heptafluoroisopropyl, nona-fluorobutyl, nonafluoroisobutyl, undecylfluoro-pentyl, undecylfluoroisopentyl, 6-hydroxyhexyl and propylsulfonic acid;

glycols, butylene glycols and oligomers thereof having 1 to 100 units and a hydrogen or a C$_1$-C$_8$-alkyl as the end group, such as, for example, R$^A$O—(CHR$^B$—CH$_2$—O)$_m$—CHR$^B$—CH$_2$— or R$^A$O—(CH$_2$CH$_2$CH$_2$CH$_2$O)$_m$—CH$_2$CH$_2$CH$_2$CH$_2$O— where R$^A$ and R$^B$ are preferably hydrogen, methyl or ethyl and m is preferably 0 to 3, in particular 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxatridecyl and 3,6,9,12-tetraoxatetradecyl;

vinyl; and allyl

N,N-di-C$_1$-C$_6$-alkylamino, such as, for example, N,N-dimethylamino and N,N-diethylamino.

It is particularly preferable for the radical R to represent unbranched and unsubstituted C$_1$-C$_{18}$-alkyl, for example methyl, ethyl, allyl, 1-propyl, 1-butyl, 1-pentyl, 1-hexyl, 1-heptyl, 1-octyl, 1-decyl, 1-dodecyl, 1-tetradecyl, 1-hexadecyl, 1-octadecyl, in particular methyl, ethyl, 1-butyl, and 1-octyl and also CH$_3$O—(CH$_2$CH$_2$O)$_m$—CH$_2$CH$_2$— and CH$_3$CH$_2$O—(CH$_2$CH$_2$O)$_m$—CH$_2$CH$_2$— where m is 0 to 3.

Preferably, the radicals R$^1$ to R$^9$ independently of one another represent hydrogen;

halogen;

a functional group

C$_1$-C$_{18}$-alkyl optionally substituted by functional groups, aryl, alkyl, aryloxy, alkoxy, halogen, hetero atoms and/or heterocyclic radicals and/or interrupted by one or more oxygen and/or sulfur atoms and/or one or more substituted or unsubstituted imino groups;

C$_2$-C$_{18}$-alkenyl optionally substituted by functional groups, aryl, alkyl, aryloxy, alkoxy, halogen, hetero atoms and/or heterocyclic radicals and/or interrupted by one or more oxygen and/or sulfur atoms and/or one or more substituted or unsubstituted imino groups;

C$_6$-C$_{12}$-aryl optionally substituted by functional groups, aryl, alkyl, aryloxy, alkoxy, halogen, hetero atoms and/or heterocyclic radicals;

C$_5$-C$_{12}$-cycloalkyl optionally substituted by functional groups, aryl, alkyl, aryloxy, alkoxy, halogen, hetero atoms and/or heterocyclic radicals;

C$_5$-C$_{12}$-cycloalkenyl optionally substituted by functional groups, aryl, alkyl, aryloxy, alkoxy, halogen, hetero atoms and/or heterocyclic radicals;

a five- to six-membered heterocyclic radical containing oxygen, nitrogen and/or sulfur atoms and optionally substituted by functional groups, aryl, alkyl, aryloxy, alkoxy, halogen, hetero atoms and/or heterocyclic radicals; or two adjacent radicals together represent an unsaturated, saturated or aromatic ring optionally substituted by functional groups, aryl, alkyl, aryloxy, alkoxy, halogen, hetero atoms and/or heterocyclic radicals and optionally interrupted by one or more oxygen and/or sulfur atoms and/or one or more substituted or unsubstituted imino groups.

C$_1$-C$_{18}$-Alkyl optionally substituted by functional groups, aryl alkyl, aryloxy, alkoxy, halogen, hetero atoms and/or heterocyclic radicals is preferably methyl, ethyl, 1-propyl, 2-propyl, 1-butyl, 2-butyl, 2-methyl-1-propyl(isobutyl), 2-methyl-2-propyl(tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, 2-ethylhexyl 2,4,4-trimethylpentyl, 1,1,3,3-tetramethylbutyl, 1-nonyl, 1-decyl, 1-undecyl, 1-dodecyl, 1-tridecyl, 1-tetradecyl, 1-pentadecyl, 1-hexadecyl, 1-heptadecyl, 1-octadecyl, cyclopentylmethyl, 2-cyclopentylethyl, 3-cyclopentyl-propyl, cyclohexylmethyl, 2-cyclohexylethyl, 3-cyclohexylpropyl, benzyl(phenylmethyl), diphenylmethyl (benzhydryl), triphenylmethyl, 1-phenylethyl, 2-phenylethyl, 3-phenylpropyl, α,α-dimethylbenzyl, p-tolylmethyl, 1-(p-butylphenyl)-ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di-(methoxycarbonyl)-ethyl, methoxy, ethoxy, formyl, 1,3-dioxolan-2-yl, 1,3-dioxan-2-yl, 2-methyl-1,3-dioxolan-2-yl, 4-methyl-1,3-dioxolan-2-yl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl, 6-ethoxyhexyl, acetyl, $C_mF_{2(m-a)+(1-b)}H_{2a+b}$ where m is 1 to 30, $0 \leq a \leq m$ and b=0 or 1 (for example $CF_3$, $C_2F_5$, $CH_2CH_2$—$C_{(m-2)}F_{2(m-2)+1}$, $C_6F_{13}$, $C_8F_{17}$, $C_{10}F_{21}$, $C_{12}R_{25}$), chloromethyl, 2-chloroethyl, trichloromethyl, 1,1-dimethyl-2-chloroethyl, methoxymethyl, 2-butoxyethyl, diethoxymethyl, diethoxyethyl, 2-isopropoxyethyl, 2-butoxypropyl, 2-octyloxyethyl, 2-methoxyisopropyl, 2-(methoxycarbonyl)-ethyl, 2-(ethoxycarbonyl)-ethyl, 2-(n-butoxycarbonyl)-ethyl, butylthiomethyl, 2-dodecylthioethyl, 2-phenylthioethyl, 5-hydroxy-3-oxa-pentyl, 8-hydroxy-3,6-dioxa-octyl, 11-hydroxy-3,6,9-trioxa-undecyl, 7-hydroxy-4-oxa-heptyl, 11-hydroxy-4,8-dioxa-undecyl, 15-hydroxy-4,8,12-trioxa-pentadecyl, 9-hydroxy-5-oxa-nonyl, 14-hydroxy-5,10-dioxatetradecyl, 5-methoxy-3-oxa-pentyl, 8-methoxy-3,6-dioxaoctyl, 11-methoxy-3,6,9-trioxa-undecyl, 7-methoxy-4-oxaheptyl, 11-methoxy-4,8-dioxa-undecyl, 15-methoxy-4,8,12-trioxa-pentadecyl, 9-methoxy-5-oxa-nonyl, 14-methoxy-5,10-dioxa-tetradecyl, 5-ethoxy-3-oxa-pentyl, 8-ethoxy-3,6-dioxa-octyl, 11-ethoxy-3,6,9-trioxa-undecyl, 7-ethoxy-4-oxa-heptyl, 11-ethoxy-4,8-dioxa-undecyl, 15-ethoxy-4,8,12-trioxa-pentadecyl, 9-ethoxy-5-oxa-nonyl or 14-ethoxy-5,10-oxa-tetradecyl.

$C_2$-$C_{18}$-Alkenyl optionally substituted by functional groups, aryl, alkyl, aryloxy, alkoxy, halogen, hetero atoms and/or heterocyclic radicals and/or interrupted by one or more oxygen and/or sulfur atoms and/or one or more substituted or unsubstituted imino groups is preferably vinyl, 2-propenyl, 3-butenyl, cis-2-butenyl, trans-2-butenyl or $C_mF_{2(m-a)-(1-b)}H_{2a-b}$ where $m \leq 30$, $0 \leq a \leq m$ and b=0 or 1.

$C_6$-$C_{12}$-Aryl optionally substituted by functional groups, aryl, alkyl, aryloxy, alkoxy, halogen, hetero atoms and/or heterocyclic radicals is preferably phenyl, tolyl, xylyl, α-naphthyl, β-naphthyl, 4-diphenylyl, chlorophenyl, dichlorophenyl, trichlorophenyl, di-fluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methyl-naphthyl, isopropylnaphthyl, chloronaphthyl, ethoxy-naphthyl, 2,6-dimethylphenyl, 2,4,6-trimethylphenyl, 2,6-dimethoxyphenyl, 2,6-dichlorophenyl, 4-bromophenyl, 2-nitrophenyl, 4-nitrophenyl, 2,4-dinitrophenyl, 2,6-dinitrophenyl, 4-dimethylaminophenyl, 4-acetylphenyl, methoxyethylphenyl, ethoxymethylphenyl, methylthiophenyl, isopropylthiophenyl or tert-butylthiophenyl or $C_6F_{(5-a)}H_a$ where $0 \leq a \leq 5$.

$C_5$-$C_{12}$-Cycloalkyl optionally substituted by functional groups, aryl, alkyl, aryloxy, alkoxy, halogen, hetero atoms and/or heterocyclic radicals is preferably cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl, $C_mF_{2(m-a)-(1-b)}H_{2a-b}$ where $m \leq 30$, $0 \leq a \leq m$ and b=0 or 1 and a saturated or unsaturated bicyclic system, such as e.g. norbornyl or norbornenyl.

$C_5$-$C_{12}$-Cycloalkenyl optionally substituted by functional groups, aryl, alkyl, aryloxy, alkoxy, halogen, hetero atoms and/or heterocyclic radicals is preferably 3-cyclopentenyl, 2-cyclohexenyl, 3-cyclohexenyl, 2,5-cyclohexadienyl or $C_nF_{2(m-a)-3(1-b)}H_{2a-3b}$ where $m \leq 30$, $0 \leq a \leq m$ and b=0 or 1.

A five- to six-membered heterocyclic radical containing oxygen, nitrogen and/or sulfur atoms and optionally substituted by functional groups, aryl, alkyl, aryloxy, alkoxy, halogen, hetero atoms and/or heterocyclic radicals is preferably furyl, thiophenyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl or difluoropyridyl.

If two adjacent radicals together form an unsaturated, saturated or aromatic ring optionally substituted by functional groups, aryl, alkyl, aryloxy, alkoxy, halogen, hetero atoms and/or heterocyclic radicals and optionally interrupted by one or more oxygen and/or sulfur atoms and/or one or more substituted or unsubstituted imino groups, this is preferably 1,3-propylene, 1,4-butylene, 1,5-pentylene, 2-oxa-1,3-propylene, 1-oxa-1,3-propylene, 2-oxa-1,3-propylene, 1-oxa-1,3-propenylene, 3-oxa-1,5-pentylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

If the abovementioned radicals comprise oxygen and/or sulfur atoms and/or substituted or unsubstituted imino groups, the number of oxygen and/or sulfur atoms and/or imino groups is not limited. As a rule, it is not more than 5 in the radical, preferably not more than 4 and very particularly preferably not more than 3.

If the abovementioned radicals comprise hetero atoms, there is as a rule at least one carbon atom, preferably at least two carbon atoms between two hetero atoms.

Particularly preferably, the radicals $R^1$ to $R^9$ independently of one another represent hydrogen;

unbranched or branched $C_1$-$C_{18}$-alkyl having a total of 1 to 20 carbon atoms which is unsubstituted or substituted once to several times by hydroxyl, halogen, phenyl, cyano, $C_1$-$C_6$-alkoxycarbonyl and/or $SO_3H$, such as, for example, methyl, ethyl, 1-propyl, 2-propyl, 1-butyl, 2-butyl, 2-methyl-1-propyl, 2-methyl-2-propyl, 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, 2-hydroxyethyl, benzyl, 3-phenylpropyl, 2-cyanoethyl, 2-(methoxycarbonyl)-ethyl, 2-(ethoxycarbonyl)-ethyl, 2-(n-butoxycarbonyl)-ethyl, trifluoromethyl, di-fluoromethyl, fluoromethyl, pentafluoroethyl, heptafluoropropyl, heptafluoroisopropyl, nona-fluorobutyl, nonafluoroisobutyl, undecylfluoro-pentyl, undecylfluoroisopentyl, 6-hydroxyhexyl and propylsulfonic acid;

glycols, butylene glycols and oligomers thereof having 1 to 100 units and a hydrogen or a $C_1$- to $C_8$-alkyl as the end group, such as, for example, $R^AO$—$(CHR^B$—$CH_2$—$O)_m$—$CHR^B$—$CH_2$— or $R^AO$—$(CH_2CH_2CH_2CH_2O)_m$—$CH_2CH_2CH_2CH_2O$— where $R^A$ and $R^B$ are preferably hydrogen, methyl or ethyl and n is preferably 0 to 3, in particular 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxatridecyl and 3,6,9,12-tetraoxatetradecyl;

vinyl; and allyl

N,N-di-$C_1$-$C_6$-alkylamino, such as, for example, N,N-dimethylamino and N,N-diethylamino.

Very particularly preferably, the radicals $R^1$ to $R^9$ independently of one another represent hydrogen or $C_1$-$C_{18}$-alkyl, such as, for example, methyl, ethyl, 1-butyl, 1-pentyl, 1-hexyl, 1-heptyl or 1-octyl, phenyl, 2-hydroxyethyl, 2-cyanoethyl, 2-(methoxycarbonyl)ethyl, 2-(ethoxycarbonyl)ethyl, 2-(n-butoxycarbonyl)ethyl, N,N-dimethylamino, N,N-diethylamino, chlorine and $CH_3O-(CH_2CH_2O)_m-CH_2CH_2-$ and $CH_3CH_2O-(CH_2CH_2O)_m-CH_2CH_2-$ where m is 0 to 3.

Pyridinium ions (IIIa) which are very particularly preferably employed are those in which
one of the radicals $R^1$ to $R^5$ is methyl, ethyl or chlorine and the remaining radicals $R^1$ to $R^5$ are hydrogen;
$R^3$ is dimethylamino and the remaining radicals $R^1$, $R^2$, $R^4$ and $R^5$ are hydrogen;
all the radicals $R^1$ to $R^5$ are hydrogen;
$R^2$ is carboxyl or carboxamide and the remaining radicals $R^1$, $R^2$, $R^4$ and $R^5$ are hydrogen; or
$R^1$ and $R^2$ or $R^2$ and $R^3$ are 1,4-buta-1,3-dienylene and the remaining radicals $R^1$, $R^2$, $R^4$ and $R^5$ are hydrogen;
and in particular those in which
$R^1$ to $R^5$ are hydrogen; or
one of the radicals $R^1$ to $R^5$ is methyl or ethyl and the remaining radicals $R^1$ to $R^5$ are hydrogen.

Very particularly preferred pyridinium ions (IIIa) which may be mentioned are 1-methylpyridinium, 1-ethylpyridinium, 1-(1-butyl)-pyridinium, 1-(1-hexyl)-pyridinium, 1-(1-octyl)-pyridinium, 1-(1-dodecyl)-pyridinium, 1-(1-tetradecyl)-pyridinium, 1-(1-hexa-decyl)-pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium and 1-(1-octyl)-2-methyl-3-ethylpyridinium, 1-(1-dodecyl)-2-methyl-3-ethylpyridinium, 1-(1-tetradecyl)-2-methyl-3-ethylpyridinium and 1-(1-hexadecyl)-2-methyl-3-ethylpyridinium.

Pyridazinium ions (IIIb) which are very particularly preferably employed are those in which
$R^1$ to $R^4$ are hydrogen; or
one of the radicals $R^1$ to $R^4$ is methyl or ethyl and the remaining radicals $R^1$ to $R^4$ are hydrogen.

Pyrimidinium ions (IIIc) which are very particularly preferably employed are those in which
$R^1$ is hydrogen, methyl or ethyl and $R^2$ to $R^4$ independently of one another are hydrogen or methyl; or
$R^1$ is hydrogen, methyl or ethyl, $R^2$ and $R^4$ are methyl and $R^3$ is hydrogen.

Pyrazinium ions (IIId) which are very particularly preferably employed are those in which
$R^1$ is hydrogen, methyl or ethyl and $R^2$ to $R^4$ independently of one another are hydrogen or methyl;
$R^1$ is hydrogen, methyl or ethyl, $R^2$ and $R^4$ are methyl and $R^3$ is hydrogen;
$R^1$ to $R^4$ are methyl; or
$R^1$ to $R^4$ are methyl hydrogen.

Imidazolium ions (IIIe) which are very particularly preferably employed are those in which
$R^1$ is hydrogen, methyl, ethyl, 1-propyl, 1-butyl, 1-pentyl, 1-hexyl, 1-octyl, allyl, 2-hydroxyethyl or 2-cyanoethyl and $R^2$ to $R^4$ independently of one another are hydrogen, methyl or ethyl.

Very particularly preferred imidazolium ions (IIIe) which may be mentioned are 1-methylimidazolium, 1-ethylimidazolium, 1-(1-butyl)-imidazolium, 1-(1-octyl)-imidazolium, 1-(1-dodecyl)-imidazolium, 1-(1-tetra-decyl)-imidazolium, 1-(1-hexadecyl)-imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium and 1,4,5-trimethyl-3-octylimidazolium.

Pyrazolium ions (IIIf), (IIIg) or (IIIg') which are very particularly preferably employed are those in which
$R^1$ is hydrogen, methyl or ethyl and $R^2$ to $R^4$ independently of one another are hydrogen or methyl.

Pyrazolium ions (IIIh) which are very particularly preferably employed are those in which
$R^1$ to $R^4$ independently of one another are hydrogen or methyl.

1-Pyrazolinium ions (IIIi) which are very particularly preferably employed are those in which
$R^1$ to $R^6$ independently of one another are hydrogen or methyl.

2-Pyrazolinium ions (IIIj) or (IIIj') which are very particularly preferably employed are those in which
$R^1$ is hydrogen, methyl or phenyl and $R^2$ to $R^6$ independently of one another are hydrogen or methyl.

3-Pyrazolinium ions (IIIk) or (IIIk') which are very particularly preferably employed are those in which
$R^1$ and $R^2$ independently of one another are hydrogen, methyl, ethyl or phenyl and $R^3$ to $R^6$ independently of one another are hydrogen or methyl.

Imidazolinium ions (IIIl) which are very particularly preferably employed are those in which
$R^1$ and $R^2$ independently of one another are hydrogen, methyl, ethyl, 1-butyl or phenyl, $R^3$ and $R^4$ independently of one another are hydrogen, methyl or ethyl and $R^5$ and $R^6$ independently of one another are hydrogen or methyl.

Imidazolinium ions (IIIm) or (IIIm') which are very particularly preferably employed are those in which
$R^1$ and $R^2$ independently of one another are hydrogen, methyl or ethyl and $R^3$ to $R^6$ independently of one another are hydrogen or methyl.

Imidazolinium ions (IIIn) or (IIIn') which are very particularly preferably employed are those in which $R^1$ to $R^3$ independently of one another are hydrogen, methyl or ethyl and $R^4$ to $R^6$ independently of one another are hydrogen or methyl.

Thiazolium ions (IIIo) or (IIIo') and oxazolium ions (IIIp) which are very particularly preferably employed are those in which $R^1$ is hydrogen, methyl, ethyl or phenyl and $R^2$ and $R^3$ independently of one another are hydrogen or methyl.

1,2,4-Triazolium ions (IIIq), (IIIq') or (IIIq") which are very particularly preferably employed are those in which $R^1$ and $R^2$ independently of one another are hydrogen, methyl, ethyl or phenyl and $R^3$ is hydrogen, methyl or phenyl.

1,2,3-Triazolium ions (IIIr), (IIIr') or (IIIr") which are very particularly preferably employed are those in which $R^1$ is hydrogen, methyl or ethyl and $R^2$ and $R^3$ independently of one another are hydrogen or methyl, or $R^2$ and $R^3$ together are 1,4-buta-1,3-dienylene.

Pyrrolidinium ions (IIIs) which are very particularly preferably employed are those in which $R^1$ is hydrogen, methyl, ethyl or phenyl and $R^2$ to $R^9$ independently of one another are hydrogen or methyl.

Imidazolidinium ions (IIIt) which are very particularly preferably employed are those in which $R^1$ and $R^4$ independently of one another are hydrogen, methyl, ethyl or phenyl and $R^2$ and $R^3$ and $R^5$ to $R^8$ independently of one another are hydrogen or methyl.

Ammonium ions (IIIu) which are very particularly preferably employed are those in which $R^1$ to $R^3$ independently of one another are $C_1$-$C_{18}$-alkyl; or $R^1$ and $R^2$ together are 1,5-pentylene or 3-oxa-1,5-pentylene and $R^3$ is $C_1$-$C_{18}$-alkyl, 2-hydroxyethyl or 2-cyanoethyl.

Very particularly preferably ammonium ions (IIIu) which may be mentioned are methyl-tri-(1-butyl)-ammonium, N,N-dimethylpiperidinium and N,N-dimethylmorpholinium.

Examples of the tertiary amines from which the quaternary ammonium ions of the general formula (IIIu) are derived by quaternization with the radicals R mentioned are diethyl-n-butylamine, diethyl-tert-butylamine, diethyl-n-pentylamine, diethylhexylamine, diethyloctylamine, diethyl-(2-ethylhexyl)-amine, di-n-propylbutylamine, di-n-propyl-n-pentylamine, di-n-propylhexylamine, di-n-propyloctylamine, di-n-propyl-(2-ethylhexyl)-amine, diisopropylethylamine, diisopropyl-n-propylamine, diisopropylbutylamine, diisopropylpentylamine, diisopropylhexylamine, diisopropyloctylamine, diisopropyl-(2-ethylhexyl)-amine, di-n-butylethylamine, di-n-butyl-n-propylamine, di-n-butyl-n-pentylamine, di-n-butylhexylamine, di-n-butyl-octylamine, di-n-butyl-(2-ethylhexyl)-amine, N-n-butylpyrrolidine, N-sec-butylpyrrolidine, N-tert-butyl-pyrrolidine, N-n-pentylpyrrolidine, N,N-dimethyl-cyclohexylamine, N,N-diethylcyclohexylamine, N,N-di-n-butylcyclohexylamine, N-n-propylpiperidine, N-iso-propylpiperidine, N-n-butylpiperidine, N-sec-butylpiperidine, N-tert-butylpiperidine, N-n-pentyl-piperidine, N-n-butylmorpholine, N-sec-butylmorpholine, N-tert-butylmorpholine, N-n-pentylmorpholine, N-benzyl-N-ethylaniline, N-benzyl-N-n-propylaniline, N-benzyl-N-isopropylaniline, N-benzyl-N-n-butylaniline, N,N-dimethyl-p-toluidine, N,N-diethyl-p-toluidine, N,N-di-n-butyl-p-toluidine, diethylbenzylamine, di-n-propyl-benzylamine, di-n-butylbenzylamine, diethylphenylamine, di-n-propylphenylamine and di-n-butylphenylamine.

Preferred tertiary amines are diisopropylethylamine, diethyl-tert-butylamine, diisopropylbutylamine, di-n-butyl-n-pentylamine, N,N-di-n-butylcyclohexylamine and tertiary amines of pentyl isomers.

Particularly preferred tertiary amines are di-n-butyl-n-pentylamine and tertiary amines of pentyl isomers. A further preferred tertiary amine, which has three identical radicals, is triallylamine.

Guanidinium ions (IIIv) which are very particularly preferably employed are those in which $R^1$ to $R^5$ are methyl A very particularly preferred guanidinium ion (IIIv) which may be mentioned is N,N,N',N',N",N"-hexamethylguanidinium.

Cholinium ions (IIIw) which are very particularly preferably employed are those in which $R^1$ and $R^2$ independently of one another are methyl, ethyl, 1-butyl or 1-octyl and $R^3$ is hydrogen, methyl, ethyl, acetyl, —$SO_2OH$ or —$PO(OH)_2$;

$R^1$ is methyl, ethyl, 1-butyl or 1-octyl, $R^2$ is a —$CH_2$—$CH_2$—$OR^4$ group and $R^3$ and $R^4$ independently of one another are hydrogen, methyl, ethyl, acetyl, —$SO_2OH$ or —$PO(OH)_2$; or $R^1$ is a —$CH_2$—$CH_2$—$OR^4$ group, $R^2$ is a —$CH_2$—$CH_2$—$OR^5$ group and $R^3$ to $R^5$ independently of one another are hydrogen, methyl, ethyl, acetyl, —$SO_2OH$ or —$PO(OH)_2$.

Particularly preferred cholinium ions (IIIw) are those in which $R^3$ is chosen from hydrogen, methyl, ethyl, acetyl, 5-methoxy-3-oxa-pentyl, 8-methoxy-3,6-dioxa-octyl, 11-methoxy-3,6,9-trioxa-undecyl, 7-methoxy-4-oxa-heptyl, 11-methoxy-4,8-dioxa-undecyl, 15-methoxy-4,8,12-trioxa-pentadecyl, 9-methoxy-5-oxa-nonyl, 14-methoxy-5,10-oxa-tetradecyl, 5-ethoxy-3-oxa-pentyl, 8-ethoxy-3,6-dioxa-octyl, 11-ethoxy-3,6,9-trioxa-undecyl, 7-ethoxy-4-oxa-heptyl, 11-ethoxy-4,8-dioxa-undecyl, 15-ethoxy-4,8,12-trioxa-pentadecyl, 9-ethoxy-5-oxa-nonyl, or 14-ethoxy-5,10-oxa-tetradecyl.

Very particularly preferred cholinium ions (IIIw) which may be mentioned are trimethyl-2-hydroxyethylammonium, dimethyl-bis-2-hydroxyethylammonium or methyl-tris-2-hydroxyethylammonium.

Phosphonium ions (IIIx) which are very particularly preferably employed are those in which $R^1$ to $R^3$ independently of one another are $C_1$-$C_{18}$-alkyl, in particular butyl, isobutyl, 1-hexyl or 1-octyl.

Among the abovementioned heterocyclic cations, the pyridinium ions, pyrazolinium and pyrazolium ions and the imidazolinium and imidazolium ions are preferred. Ammonium and cholinium ions are furthermore preferred.

Particularly preferred ions are 1-methylpyridinium, 1-ethylpyridinium, 1-(1-butyl)-pyridinium, 1-(1-hexyl)-pyridinium, 1-(1-octyl)-pyridinium, 1-(1-dodecyl)-pyridinium, 1-(1-tetradecyl)-pyridinium, 1-(1-hexa-decyl)-pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium, 1-(1-octyl)-2-methyl-3-ethylpyridinium, 1-(1-dodecyl)-2- methyl-3-ethylpyridinium, 1-(1-tetra-decyl)-2-methyl-3-ethylpyridinium, 1-(1-hexadecyl)-2-methyl-3-ethylpyridinium, 1-methylimidazolium, 1-ethylimidazolium, 1-(1-butyl)-imidazolium, 1-(1-octyl)-imidazolium, 1-(1-dodecyl)-imidazolium, 1-(1-tetradecyl)-imidazolium, 1-(1-hexadecyl)-imidazolium, 1,3-dimethylimidazolium, 1-ethyl-3-methylimidazolium, 1-(1-butyl)-3-methylimidazolium, 1-(1-hexyl)-3-methylimidazolium, 1-(1-octyl)-3-methylimidazolium, 1-(1-dodecyl)-3-methylimidazolium, 1-(1-tetradecyl)-3-methylimidazolium, 1-(1-hexadecyl)-3-methylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium and 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium, 1,4,5-trimethyl-3-octylimidazolium, trimethyl-2-hydroxyethylammonium, dimethyl-bis-2-hydroxyethylammonium and methyl-tris-2-hydroxyethylammonium.

In principle, all anions can be employed as anions.

The anion $[Y]^{n-}$ of the ionic liquid is chosen, for example, from the group consisting of halides and halogen-containing compounds of the formula:
$F^-$, $Cl^-$, $Br^-$, $I^-$, $BF_4^-$, $PF_6^-$, $CF_3SO_3^-$, $(CF_3SO_3)_2N^-$, $CF_3CO_2^-$, $CCl_3CO_2^-$, $CN^-$, $SCN^-$, $OCN^-$ the group consisting of sulfates, sulfites and sulfonates of the general formula:
$SO_4^{2-}$, $HSO_4^-$, $SO_3^{2-}$, $HSO_3^-$, $R^aOSO_3^-$, $R^aSO_3^-$ the group consisting of phosphates of the general formula
$PO_4^{3-}$, $HPO_4^{2-}$, $H_2PO_4^-$, $R^aPO_4^{2-}$, $HR^aPO_4^-$, $R^aR^bPO_4^-$ the group consisting of phosphonates and phosphinates of the general formula:
$R^aHPO_3^-$, $R^aR^bPO_2^-$, $R^aR^bPO_3^-$ the group consisting of phosphites of the general formula:
$PO_3^{3-}$, $HPO_3^{2-}$, $H_2PO_3^-$, $R^aPO_3^{2-}$, $R^aHPO_3^-$, $R^aR^bPO_3^-$ the group consisting of phosphonites and phosphinites of the general formula:
$R^aR^bPO_2^-$, $R^aHPO_2^-$, $R^aR^bPO^-$, $R^aHPO^-$ the group consisting of carboxylic acids of the general formula:
$R^aCOO^-$ the group consisting of borates of the general formula:
$BO_3^{3-}$, $HBO_3^{2-}$, $H_2BO_3^-$, $R^aR^bBO_3^-$, $R^aHBO_3^-$, $R^aBO_3^{2-}$, $B(OR^a)(OR^b)(OR^c)(OR^d)^-$, $B(HSO_4)^-$, $B(R^aSO_4)^-$ the group consisting of boronates of the general formula:
$R^aBO_2^{2-}$, $R^aR^bBO^-$ the group consisting of silicates and silicic acid esters of the general formula:
$SiO_4^{4-}$, $HSiO_4^{3-}$, $H_2SiO_4^{2-}$, $H_3SiO_4^-$, $R^aSiO_4^{3-}$, $R^aR^b SiO_3^{2-}$, $R^aR^bR^cSiO_4^-$, $HR^aSiO_4^{2-}$, $H_2R^aSiO_4^-$, $HR^aR^bSiO_4^-$ the group consisting of alkyl- or arylsilane salts of the general formula:
$R^aSiO_3^{3-}$, $R^aR^bSiO_2^{2-}$, $R^aR^bR^cSiO^-$, $R^aR^bR^cSiO_3^-$, $R^aR^bR^cSiO_2^-$, $R^aR^bSiO_3^{2-}$ the group consisting of carboxylic acid imides, bis(sulfonyl)imides and sulfonylimides of the general formula:

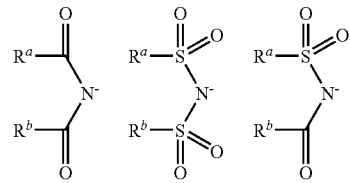

the groups consisting of methides of the general formula:

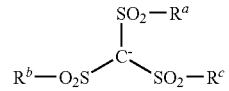

In these formulae, $R^a$, $R^b$, $R^c$ and $R^d$ independently of one another each denote hydrogen, $C_1$-$C_{30}$-alkyl, $C_2$-$C_{18}$-alkyl, optionally interrupted by one or more non-adjacent oxygen and/or sulfur atoms and/or one or more substituted or unsubstituted imino groups, $C_6$-$C_{14}$-aryl, $C_5$-$C_{12}$-cycloalkyl or a five- to six-membered heterocyclic radical containing oxygen, nitrogen and/or sulfur atoms, wherein two of them together can form an unsaturated, saturated or aromatic ring optionally interrupted by one or more oxygen and/or sulfur atoms and/or one or more unsubstituted or substituted imino groups, and wherein the radicals mentioned can each additionally be substituted by functional groups, aryl, alkyl, aryloxy, alkoxy, halogen, hetero atoms and/or heterocyclic radicals.

In these formulae, $C_1$-$C_{18}$-alkyl optionally substituted by functional groups, aryl, alkyl, aryloxy, alkoxy, halogen, hetero atoms and/or heterocyclic radicals is, for example, methyl, ethyl, propyl, isopropyl, n-butyl, sec-butyl, tert-butyl, pentyl hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, benzyl, 1-phenylethyl, α,α-dimethylbenzyl, benzhydryl, p-tolylmethyl, 1-(p-butylphenyl)-ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di(methoxycarbonyl)-ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl.

$C_2$-$C_{18}$-Alkyl optionally interrupted by one or more non-adjacent oxygen and/or sulfur atoms and/or one or more substituted or unsubstituted imino groups is, for example, 5-hydroxy-3-oxapentyl, 8-hydroxy-3,6-dioxa-octyl, 11-hydroxy-3,6,9-trioxaundecyl, 7-hydroxy-4-oxa-heptyl, 11-hydroxy-4,8-dioxaundecyl, 15-hydroxy-4,8,12-trioxapentadecyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

If two radicals form a ring, these radicals together can denote, for example as a fused unit, 1,3-propylene, 1,4-butylene, 2-oxa-1,3-propylene, 1-oxa-1,3-propylene, 2-oxa-1,3-propenylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

The number of non-adjacent oxygen and/or sulfur atoms and/or imino groups is in principle not limited, or is limited automatically by the size of the radical or of the ring unit. As a rule, it is not more than 5 in the particular radical, preferably not more than 4 or very particularly preferably not more than 3. There is furthermore as a rule at least one, preferably at least two carbon atom(s) between two hetero atoms.

Substituted and unsubstituted imino groups can be, for example, imino, methylimino, isopropylimino, n-butylimino or tert-butylimino.

The term "functional groups" is to be understood as meaning, for example, the following: carboxyl, carboxamide, hydroxyl, di-($C_1$-$C_4$-alkyl)-amino, $C_1$-$C_4$-alkoxycarbonyl, cyano or $C_1$-$C_4$-alkoxy. In this context, $C_1$ to $C_4$-alkyl is methyl, ethyl, propyl, isopropyl, n-butyl, sec-butyl or tert-butyl.

$C_6$-$C_{14}$-Aryl optionally substituted by functional groups, aryl, alkyl, aryloxy, alkoxy, halogen, hetero atoms and/or heterocyclic radicals is, for example, phenyl, tolyl, xylyl, α-naphthyl, β-naphthyl, 4-diphenylyl, chlorophenyl, dichlorophenyl, trichlorophenyl, di-fluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methyl-naphthyl, isopropylnaphthyl, chloronaphthyl, ethoxy-naphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl.

$C_5$-$C_{12}$-Cycloalkyl optionally substituted by functional groups, aryl, alkyl, aryloxy, halogen, hetero atoms and/or heterocyclic radicals is, for example, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl diethoxycyclohexyl, butylthiocyclohexyl, chlorocyclohexyl, dichlorocyclohexyl, dichlorocyclopentyl and a saturated or unsaturated bicyclic system, such as norbornyl or norbornenyl.

A five- to six-membered heterocyclic radical containing oxygen, nitrogen and/or sulfur atoms is, for example, furyl, thiophenyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl, difluoropyridyl, methylthiophenyl, isopropylthiophenyl or tert-butylthiophenyl.

It goes without saying that the use of a mixture, adjusted in a targeted manner, of various ionic liquids described above can also be advantageously undertaken in the individual case. In the context of the invention, it has been found that ionic liquids with an imidazolium cation in the salt in question are of particular advantage. It is very particularly preferable here for the 1- and 3-position or the 1-, 2- and 3-position of the imidazolium ring to be substituted by a ($C_1$-$C_6$)-alkyl group. It has proved to be of particular advantage if the imidazolium cation is a 1-ethyl-3-methylimidazolium, 1,3-dimethylimidazolium or a 1-butyl-3-methylimidazolium cation.

The cations described above for the ionic liquid are also not substantially limited in respect of the choice of the corresponding anion. It is particularly preferable for the anion to the particular cation to be a halide, perchlorate, pseudohalide, sulfate, in particular hydrogen sulfate, sulfite, sulfonate, phosphate, alkyl-phosphate, in particular the mono- and/or dialkyl-phosphate anion (preferred alkyl group is the methyl, ethyl or propyl group) and/or a carboxylate anion, in particular a $C_1$-$C_6$-carboxylate anion (preferably acetate or propionate anion). It is particularly preferable for the halide ion to be present as the chloride, bromide and/or iodide ion, the pseudohalide ion to be present as the cyanide, thiocyanate and/or cyanate ion and the $C_1$-$C_6$-carboxylate ion to be present as the formate, acetate, propionate, butyrate, hexanoate, maleate, fumarate, oxalate, lactate, pyruvate, methanesulfonate, tosylate and/or alkane-sulfate ion.

For the sake of order, the following advantageous anions are also to be named: $R^a$—COO$^-$, $R^a$—SO$_3^-$, $R^aR^bPO_4^-$ (wherein $R^a$ and $R^b$ have the meaning already described above), which include, in particular, the anions of the formula $(CH_3O)_2PO_2^-$ and $(C_2H_5O)_2PO_2^-$ and the benzoate anion, preferably $(C_2H_5O)_2PO_2^-$ and the benzoate anion.

It is easily possible for the person skilled in the art to employ the particularly suitable ionic liquid for the particular case in which the invention is used. Particularly preferred ionic liquids are: 1-ethyl-3-methylimidazolium acetate, 1,3-dimethylimidazolium acetate, 1-butyl-3-methylimidazolium acetate, 1-ethyl-3-methylimidazolium chloride, 1-ethyl-3-methylimidazolium diethyl-phosphate, 1-methyl-3-methylimidazolium dimethyl-phosphate, 1-ethyl-3-methylimidazolium formate, 1-ethyl-3-methylimidazolium octanoate, 1,3-diethylimidazolium acetate and 1-ethyl-3-methylimidazolium propionate. Among these, the following are very particularly preferred: 1-ethyl-3-methylimidazolium acetate, 1,3-dimethylimidazolium acetate, 1-butyl-3-methylimidazolium acetate, 1-ethyl-3-methylimidazolium diethyl-phosphate, 1-methyl-3-methylimidazolium dimethyl-phosphate, 1,3-diethylimidazolium acetate and 1-ethyl-3-methylimidazolium propionate.

It can readily be seen that there are diverse possibilities for choosing a particularly suitable ionic liquid for the particular intended use, in particular also with respect to the particular anionic and cationic part. Among the large number of possibilities described above, various anions, cations and anion/cation pairs are to be emphasized as preferred in the following:

Anions: $R^a$COO$^-$, wherein: $R^a$ preferably denotes alkyl, in particular $C_1$-$C_8$-alkyl and very particularly preferably $C_1$-$C_3$-alkyl, or phenyl; phosphate, preferably dialkyl-phosphate, in particular di-($C_1$-$C_3$-alkyl)-phosphate, dimethyl-phosphate, diethyl-phosphate and di-n-propyl-phosphate being particularly preferred; phosphonate, in particular O-alkyl alkyl-phosphonate, O-methyl methyl-phosphonate, O-methyl-ethyl-phosphonate, O-ethyl-methyl-phosphonate and O-ethyl ethyl-phosphonate being particularly preferred.

Cations: Compounds of the formula IIIe already described above, in particular 1-ethyl-3-methylimidazolium (EMIM), 1-butyl-3-methylimidazolium (BMIM), 1-ethyl-2,3-dimethylimidazolium (EMMIM) and 1-butyl-2,3-dimethylimidazolium (BMMIM); compounds of the formula IIIa described above, in particular N-alkyl-pyridinium, particularly preferably N-methylpyridinium, N-ethylpyridinium, N-methyl-2-methylpyridinium, N-methyl-3-methylpyridinium, N-ethyl-2-methylpyridinium and N-ethyl-3-methylpyridinium; compounds of the formula IIIf described above, in particular 1,2,4-trimethylpyrazolium.

The following may be mentioned for a particularly preferred combination of anion+cation among the possibilities presented above: $R^aCOO^-$+compounds of the formula IIIe described above and phosphate+compounds of the formula IIIe described above.

It is furthermore to be pointed out that the following descriptions relate to advantageous embodiments of the invention, in particular the compounds described in detail specifically above. If reference is made to a specific ionic liquid in an individual case, it can readily be seen by the person skilled in the art that these statements also apply equally to the further ionic liquids described.

One possible reason for the particular advantage of the anions described above could be that these are particularly potent hydrogen-bonding acceptors and this is a reason for the good dissolving results. All these anions are known as hydrogen-bonding acceptors and participate in an extensive hydrogen bond network. It is left to the person skilled in the art to determine here, with the aid of simple tests, what anions are particularly suitable in the individual case for the particular selected carbohydrate which is to be dissolved and regenerated.

As the above observations show, the present invention is not restricted in the choice of ionic liquids. It is preferable for ionic liquid to comprise a cation of amidinium structure. The cation is preferably a substituted or unsubstituted imidazolium cation. The imidazolium cation of the ionic liquid is preferably substituted, in the 1- and also 3-position or in the 1-, 2- and also 3-position, with $(C_1-C_6)$-alkyl groups. It is particularly preferable when the imidazolium cation is the 1-ethyl-3-methylimidazolium, 1,3-dimethylimidazolium, 1,3-diethylimidazolium or the 1-butyl-3-methylimidazolium cation.

It is preferable when the anion of the ionic liquid is a halide ion, a perchlorate ion, a pseudohalide ion, a sulfate ion, a phosphate ion, an alkyl phosphate ion, in particular a $C_1$-$C_6$-carboxylate ion. It is further preferable when the halide ion is present as chloride, bromide and/or iodide ion, when the pseudohalide ion is present as cyanide, thiocyanate and/or cyanate ion and when the $C_1$-$C_6$-carboxylate ion is present as formate, acetate, propionate, butyrate, hexanoate, maleate, fumarate, oxalate, lactate and/or pyruvate ion. The following ionic liquids will be found particularly preferable: 1-ethyl-3-methylimidazolium acetate, 1,3-dimethylimidazolium acetate, 1-ethyl-3-methylimidazolium chloride, 1-butyl-3-methylimidazolium acetate, 1-ethyl-3-methylimidazolium diethyl phosphate, 1-methyl-3-methylimidazolium dimethyl phosphate, 1-ethyl-3-methylimidazolium formate, 1-ethyl-3-methylimidazolium octanoate, 1,3-diethylimidazolium acetate, 1,3-diethylimidazolium chloride and/or 1-ethyl-3-methylimidazolium propionate.

For the purposes of the invention, it is advantageous if the molten ionic liquid has a melting point of from −100 to +150° C., in particular from −30 to +100° C., the range of from −30 to +80° C. being particularly preferred. Ionic liquids having a melting point of more than 100° C. can be employed in particular if thermal degradation of the biopolymer dissolved therein can be ruled out. In the majority of cases, it is advantageous not to exceed this maximum value. The solution system described above is available for dissolving any desired biopolymers therein and subjecting them to a regeneration in a coagulation medium, which complies with the general conditions defined above relating to the surface tension according to the invention with regard to the choice of the coagulation agent or coagulation agent mixture.

The biopolymers are preferably in the form of carbohydrates as starch, cellulose and/or derivatives of starch and cellulose. It is preferable for the derivatives to represent esters or ethers. The esters can be cellulose acetate and cellulose butyrate, and the ethers can be carboxymethylcellulose, hydroxyethylcellulose and hydroxypropylcellulose.

The invention is not subject to any substantial limitation in the quantification of the biopolymers to be dissolved. Preferably, the starch, the cellulose and/or derivatives thereof are employed in the solution system in an amount of from 1 to 35 wt. %, in particular in an amount of about 5 to 20 wt. %. If the value falls below about 1 wt. %, the desired profitability is not established.

With respect to the quality sought for the regenerated biopolymer, it is expedient substantially to dissolve the starch, the cellulose and/or derivatives thereof in the solution system. This favors an advantageous quality. It is therefore expedient for the dissolving in the solution system to be carried out at about 20 to 150° C., in particular at about 30 to 120° C.

In the regeneration sought for the biopolymers dissolved in the designated solution system, in the form of carbohydrates in the coagulation medium, it is expedient for the viscosity of the solution system to be adjusted in a controlled manner. The zero viscosity of this solution system (measured with a rotary viscometer) is expediently between about 5 and 150,000 Pa·s, in particular between about 10 and 100,000 Pa·s. It is furthermore preferable for the zero viscosity to be between about 5 and 10,000 Pa·s, in particular between about 10 and 2,500 Pa·s, processing of the solution system, for example in an extruder, being particularly advantageous within these margins of the zero viscosity.

It is of particular value for the regeneration of cellulose or derivatives thereof with the aid of the solution system according to the invention if these have an average degree of polymerization of from about 200 to 3,500, in particular from about 300 to 1,500. Advantageous product properties, such as, for example, strength, modulus and rigidity, are achieved by processing of higher molecular weight cellulose (DP greater than 800).

It is not part of the present invention to designate a process for producing the above-designated solution system based on a molten ionic liquid having a content of biopolymers to be regenerated. Such a process is already apparent from PCT/EP2006/012748. Nonetheless, to assist practice of the present invention, an account follows of how a particularly suitable solution system, comprising the biopolymers, can be obtained: Accordingly, the biopolymer in the form of the carbohydrate, in particular cellulose, starch and/or derivatives thereof, is mixed with the molten ionic liquid, as defined above, until the dissolving has been carried out to the required extent, in particular is complete. Regarding the particular quantitative embodiments, reference is made to the above statements.

The mixing of the starting constituents of the solution system, comprising biopolymers, is preferably carried out under the action of high shear forces, in particular with the aid of an extruder. A twin-screw extruder has proved to be particularly advantageous here. The dissolving is furthermore promoted by simultaneously irradiating with microwaves during the mixing, and ultrasound has an action in particular. The dissolving of the biopolymers is promoted by raising the temperature of the solution system. The elevated temperature is expediently about 20 to 150° C., in particular about 30 to 120° C.

It has already been shown above that any desired biopolymers can advantageously be treated or further processed and regenerated in the context of the invention.

The process according to the invention is of particular advantage for regenerating working up of cellulose starting materials. The cellulose starting material is preferably present as fibrous cellulose, in particular wood pulp, linters or paper, and/or in the form of other natural cellulose fibers. Among the natural cellulose fibers, hemp, coconut, jute, bamboo and/or sisal fibers may be emphasized as advantageous. With respect to the optimum quality sought for the regenerated biopolymer, in particular for regenerated cellulose, it has proved to be expedient here not only to take one or more of the preferred measures referred to above, for example the degassing, but to filter the solution system which comprises the biopolymer over a filter before the further processing, in particular with application of pressure or under a vacuum, in order to rule out, for example, any undissolved particles present, and also any microgel formed. This means that "complete dissolving" shall be sought. This complete dissolving can be obtained in that the solution of the biopolymer can be filtered through a filter fabric having a mesh width of than 25 mesh, the filtered solution is clear and the flow properties thereof are structurally viscous, so that it then contains no gel particles and therefore can be further processed in an industrially particularly advantageous manner. It is advantageous if the amount of microgel is less than 2 wt. %.

To improve the quality of the process product sought, it is expedient, as already referred to above, to degas the solution system before the further processing for regeneration of the biopolymers, in particular cellulose, comprised therein, which is expediently carried out while stirring and/or under a vacuum. There are no specific framework conditions regarding this.

In order to optimize the ideas according to the invention in the regeneration of biopolymers, in particular cellulose, it is expedient to pay attention to the viscosity of the solution system with the dissolved biopolymer. It is thus advantageous if, for example, the solution system comprising cellulose has a high viscosity. In the context of the invention, it is expedient to establish a zero viscosity here (measured with a rotary viscometer) of between about 5 and 150,000 Pa·s, in particular between 10 and 100,000 Pa·s, the range of from 100 to 90,000 being particularly preferred. The content of cellulose in the solution system is preferably between about 5 and 30 wt. %, while the average degree of polymerization is, in particular, up to 3,500, and very particularly preferably should lie between about 300 to 1,500. In individual cases it is particularly advantageous if the minimum value is adjusted to about 350 and the maximum value to about 1,500. It should be emphasized that the above data on cellulose apply equally for derivatives, in particular in the form of esters and ethers.

It is indeed not necessary for successful realization of the invention absolutely to incorporate specific additives. However, additives can be added to adjust particular properties of the precipitated material obtained, in particular in the form of filaments or staple fibers of cellulose. These can be employed at various points in the process according to the invention. They can thus be added to the solution system which comprises the biopolymers, the coagulation medium and/or in a subsequent step, for example in a modification medium. The additives can be, for example, microcapsules, pore-forming agents, plasticizers, matting agents, flameproofing agents, bactericides, crosslinking agents, hydrophobizing agents, antistatics and/or coloring agents. It is moreover advantageous if an alcohol, a mixture of alcohols or a mixture of alcohol(s) and water is present in the coagulation medium, the amount having to be such that the purpose of the invention is achieved. The additives, if suitable, are preferably soluble and/or finely dispersible in the coagulation medium, the solution system and/or a subsequent modification bath. The consequence is that the process products are not disrupted in their homogeneity.

Preferably, the solution system comprising the biopolymers is adjusted to a temperature of more than about 0° C., in particular more than about 10° C., before processing and/or the coagulation medium is adjusted to a temperature of more than about 20° C. It is particularly expedient here to heat the solution system comprising biopolymers before the processing, in particular to about 80 to 120° C., or to adjust the coagulation medium in particular to a temperature of from about 40 to 90° C. This measure results in the advantage that a preferred viscosity of the solution is established and the solvent is advantageously washed out.

According to the invention, the solution system based on ionic liquid and comprising the biopolymers in solution is then used for regenerative processing, the biopolymers in the form of starch, cellulose and of derivatives of starch and cellulose being particularly preferred.

The solution system obtained as described above and comprising the biopolymers to be regenerated is then transferred in conventional manner into a coagulation medium comprising a protic coagulation agent or a mixture of protic coagulation agents which does not dissolve the biopolymers and is miscible with the molten ionic liquid. The protic coagulation agent was selected in advance on the basis of the surface tension parameter according to the invention.

The choice of protic coagulation agent is solely governed by the selection parameter with regard to the surface tension. Protic solvents are concerned here. The following coagulation agents will be found particularly advantageous: glycerol, triethylene glycol, diethylene glycol, ethylene glycol, 1,6-hexanediol, 1,4-butanediol, 1,2-propanediol and 1,3-propanediol. Also possible are mixtures of these coagulation agents, including mixtures thereof with water, provided achievement of the purpose of the invention is not impaired as a result.

The later examples are followed by Table XI. It includes a positive list of the above-identified protic solvents/coagulation agents and further agents of this kind which are suitable according to the present invention. Table XI further includes a negative list of protic solvents. It also recites a negative list of nonprotic solvents, which are not suitable for achieving the object of the present invention.

What is important is that, as shown, the concept of the present invention rests on the presence in the coagulation agent of a protic coagulation agent which maintains the identified framework conditions for the relative surface tension value a. Therefore, the addition of nonprotic coagulation agents, such as acetone, should preferably be avoided. Moreover, tests have shown that nonprotic solvents do not coagulate cellulose from solutions of cellulose in ionic liquids. The addition of nonprotic solvents to protic solvents in the coagulation bath is therefore not necessary or advantageous for coagulation. In the framework of a commercial use of the present invention, moreover, the use of a nonprotic solvent would mean a distinctly higher cost and inconvenience in recycling. The use of nonprotic solvents, therefore, is not advantageous as an addition in coagulation baths. It might be said to be a nonbinding rule that when a nonprotic solvent is present in the coagulation medium, the amount thereof, based on the sum total of protic coagulation agent and nonprotic solvent, is ideally less than 15% by weight, preferably less than 10% by weight and more particularly less than 5% by weight.

Although there is no critical restriction for the concentration of the protic coagulation agent in the coagulation medium, it is advantageous that the protic coagulation agent be used in the coagulation medium in an amount of 35% to 100% by weight, in particular 40% to 90% by weight. The possibility of including other protic solvents and/or additives and the like was discussed above, incorporated by reference.

In the further course of the process according to the invention, the solution system comprising the biopolymer is then coagulated in a conventional manner in the coagulation medium. A changed situation, then, arises in the coagulation medium because, as well as the constituents of the solvent, in particular the ionic liquid, it now comprises the original constituents of the coagulation medium, but the biopolymer originally dissolved in the solution system is coagulated.

At this stage of the process according to the invention, the regenerated biopolymer is withdrawn and the mixture referred to, comprising the ionic liquid and the coagulant, is subjected to a further processing step in order that the ionic liquid may be recovered. The ionic liquid is relatively easy to recover from the coagulation medium, as by evaporating, stripping, perforation or reverse osmosis of a volatile protic coagulation agent, for example in the form of 1,2-propanediol. It is further possible to crystallize the ionic liquid out and thereby separate it from the liquid coagulation agent. In the process, the protic coagulation agent need not be fully removed. Full removal could be inconvenient and uneconomical. The invention therefore allows a certain proportion of the protic coagulation agent, together with the ionic liquid, to be returned into the circuit of the process according to the invention, or be re-used for dissolving the biopolymers to be regenerated.

From the coagulation medium discussed above, comprising the coagulated shaped articles of the biopolymers, these shaped articles, for example fibers or films, can be separated in various ways. This can be effected, for example, by filtration, centrifugation or other suitable measures. In the case where fibers are formed, these are withdrawn from the coagulation medium in known manner.

It is advantageous in individual cases when the fibers or filaments, in particular of cellulose, which have been withdrawn from the coagulation medium are stretched in a subsequent stretching bath or else in a subsequent heating duct. The stretch ratio employed is preferably up to at least 10% and particularly up to at least 50%. The invention offers the advantageous option of stretching the fibers or filaments up to at least 70%. The stretching bath is conveniently based on solvents, preferably protic solvents, in particular in the form of glycerol, diethylene glycol, ethylene glycol, 1,6-hexanediol, 1,4-butanediol, 1,2-propanediol, 1,3-propanediol and triethylene glycol.

The invention accordingly has diverse embodiments and has been described comprehensively above with respect to these embodiments. Needless to say, the process product obtained after regeneration of the biopolymer, in particular in the form of regenerated cellulose fibers, is also to be protected here.

The present invention accordingly also provides spun fibers based on regenerated cellulose having a wet fibrillation rating of less than or equal to 2, which are non-fibrillating. They are distinguished in particular in that the ratio of wet strength to dry strength is at least 0.55, in particular at least about 0.6. This value is very particularly preferably at least about 0.7. These spun fibers are, moreover, distinguished by a content of sulfur of less than 1 mg/g, in particular less than 0.75 mg/g, and a copper content of less than 20 µg/g, in particular of less than 15 µg/g. It is preferable here for the sulfur content to be less than 0.5 mg/g, in particular less than 0.25 µg/g, and the copper content to be less than 10 µg/g, in particular less than 5 µg/g. The data on the spun fibers according to the invention regarding the sulfur and copper content relate in particular to the non-washed spun fibers emerging from the coagulation bath.

It is a particular advantage of the spun fibers according to the invention that by the very nature of their production process they do not comprise any N-oxides, for example prior art amine oxides, such as N-dimethyl-N-diethylamine or other oxides of heterocycloamines, such as pyridine oxides, in particular N-methylmorpholine N-oxide monohydrate (NMMO).

It may finally be pointed out that the spun fibers according to the invention require no farther-reaching measures to acquire the property of non-fibrillating. More particularly, they have no cross-linking developed subsequently by means of crosslinking chemicals. A person skilled in the art is readily able to detect whether such cross-linking is present. IR spectroscopy can be used for example.

The spun fibers according to the invention show a particularly advantageous maximum tensile force, i.e., wet or dry maximum tensile force, and breaking elongation. The maximum tensile force according to DIN EN ISO 2062 is at least 6 cN/tex, in particular at least 10 cN/tex. The breaking elongation according to DIN EN ISO 2062 is preferably at least 4%, in particular at least 6%.

The spun fibers according to the invention, which are obtained by wet-into-wet spinning, are distinguished, as already stated, in that they are "non-fibrillating". This requires further explanation: The lyocell fibers produced by the NMMO process have a circular to oval fiber cross-section and, in contrast to viscose and modal fibers, have a pronounced fibril structure, which is largely homogeneous over the fiber cross-section. Macrofibrils having a diameter in the range of 0.5 to 1.0 µm are present, these being relevant for the striking wet fibrillation, which is usually troublesome in industry, and pilling. The fibrillation can be classified with the aid of a fibrillating test described below.

Evaluation of Fibrillation Rating:

For testing, 8 filaments 2.5±0.2 mm in length are used and they are secured by means of adhesive tape to a U-shaped frame of polystyrene. After the 8 filaments had been applied to the frame, they are fixed with commercially available epoxy resin adhesive. The frame is placed with 4 ml of distilled water into a cylindrical 20 ml glass vessel 50 mm in height and 25 mm in diameter and subsequently 100 balls of zirconium dioxide (diameter: 1 mm) are added. The sample containers are introduced into the treatment cups of an apparatus which makes it possible to effect a suitable shaking movement to induce fibrillation. It may be preferable to use a dyeing apparatus, for example a Labomat from Mathis GmbH, for this purpose.

The treatment time in the apparatus is 3 hours at a container speed of 50 rpm and a temperature of 30° C.

This is followed by a microscopic assessment of the fibrils protruding from the actual fiber, for which the frame is transferred to a microscope slide and the filaments are separated from the frame by means of a scalpel, so that they are present on the microscope slide in the parallel arrangement. The filaments are embedded in demineralized water and provided with a cover glass. Assessment is effected in phase contrast, by counting the individual fibrils. The fibrillation rating is evaluated according to the following scheme: to 5 fibrils counted=rating 1; 6 to 10 fibrils counted=rating 2; 11 to 20 fibrils counted=rating 3; 21 to 40 fibrils counted=rating 4; 41 to 80 fibrils counted=rating 5; >80 fibrils counted=rating 6.

According to the wet fibrillation ratings cited by K. Bredereck and F. Hermanutz in Rev. Prog. Color. 35 (2005), 59, cellulose fibers produced by the NMMO process have a rating of 4 or 5, whereas normal viscose and modal have a rating of 1 and are therefore to be classified as non-fibrillating. The high wet fibrillation of the fibers obtained from NMMO is a serious disadvantage in textile finishing processes, such as e.g. in dyeing, and necessitates changed working processes and additional machine measures during processing. The production of fibrillation-free cellulose fibers obtained by the NMMO process is not possible because of the peculiarities of the spinning process (spinning via an air gap) and can be achieved only by a special after-treatment of the fibers. To avoid the tendency of so-called lyocell fibers spun from NMMO solution towards fibrillation, in the fiber after-treatment according to the prior art reactive substances which crosslink cellulose chains are added. A reduction in fibrillation can accordingly be achieved by chemical crosslinking during after-treatment of fibers which have never dried, and has led to the modified lyocell fiber types Lenzing Lyocell LF (C. Rohrer, P. Retzel and H. Firgo in Man-made Fiber Yearbook (Chem. Fibers Intern.) 2001, 8 (2001) 26 and Tencel A100 (P. Alwin and J. Taylor in Melliand Textilber., 82 (2001) 196). By introduction of the crosslinking bridges, a significantly lower irreversible cornification, as with standard lyocell fibers, occurs during the first drying. Meanwhile, the fact that the substances employed for crosslinking withstand some of the conditions prevailing in subsequent processes to only a limited extent presents problems for these low-fibrillation directly spun cellulose fibers. Thus, for example, in the case of the dichlorochloromonohydroxytriazine employed as the crosslinking agent, it is known that almost half of the crosslinking agent is split off in the course of a hydrogen peroxide bleaching conventional in industry, so that an increased fibrillation of the fibers is again obtained. It would accordingly be of great advantage if industry could be provided with directly spun, non-fibrillating cellulose fibers.

With the invention it is now possible to dissolve cellulose, which is present in the form of pulp, cotton linters etc., in a solvent suitable for this by means of a suitable dissolving routine—and without prior derivatization—and to obtain spinnable solutions which lead to the spun fibers according to the invention which have a wet fibrillation rating of equal to or less than 2 according to the test method and evaluation scale described above.

In the context of the invention, it is advantageous that the addition of sulfur-containing chemicals of the viscose process or of metals, such as copper or lithium, or salts thereof can be avoided during the production of spun fibers.

The advantages associated with the complex proposal according to the invention to achieve the object described are diverse:

The solution system according to the invention based on an ionic liquid is particularly well suited for dissolving the designated biopolymers, in particular cellulose and starch or derivatives thereof in the context of thermostatic control at a suitable dissolving temperature, until the dissolving operation is most substantially concluded. In a preferred further processing, this solution is filtered and the vacuum degassed and extruded on a spinning unit through spinnerets into a coagulation medium. This comprises the coordinated coagulation agents, which are protic solvents, as described above. For consolidation of the product, ionic liquid is washed out completely from the coagulation medium comprising regenerated biopolymers and the product, for example a cellulose fiber, is dried. For recovery for renewed use, the protic coagulation agent is removed from the ionic liquid down to the preferred content. This content can be, for example, between about 6 and 15 wt. %. Thereafter, the solution system is employed again for dissolving biopolymers. This embodiment given by way of example shows that an improved processing, such as a flexible adjustment of product properties and a particularly economical process procedure, is rendered possible.

With respect to the spun fibers obtained according to the invention, the following further advantages resulting from the particular procedure according to the invention are also to be pointed out: Outstanding solvents for cellulose can be employed, in particular in the form of 1-ethyl-3-methylimidazolium acetate (EMIM OAc). EMIM OAc leads to the following advantages: It is a liquid at room temperature. It leads to stable spinning solutions. Cellulose can be dissolved in an amount of up to 25 wt. % without problems with EMIM OAc. The preparation, filtration and the degassing of the spinning solution in industry is simple. Gel particles are very substantially ruled out. No noticeable sensitivity to air can be detected. The spinning solutions have an outstanding heat stability. The addition of stabilizers is not necessary. The spinning solution viscosity can be adjusted within a wide range (10 to 10,000 Pas), which means a high flexibility in the spinning process. The invention thus provides a very interesting process for environment-friendly production of "man-made" cellulose materials. Associated with this is a high production flexibility with a wide range of mechanical properties. No problems at all occur in subsequent processes, such as spinning of yarn, knitting or meshing, dyeing and during measures leading to improvement in fastness properties during use and manufacture, in particular color fastness.

It appears pertinent to briefly set out the particular advantages associated with the present invention, under technological aspects: Coagulating the filament or fiber (wet-into-wet technique without air gap) in water results in very rapid coagulation, resulting in the structure becoming set. It accordingly constitutes bound water. This setting of the polymer chains proceeds very rapidly in water owing to the high density of hydrogen bonds. Water becomes so to speak bound into the structure. It is also referred to as bound water. As a result, the orientation of the cellulose chains in the direction of the fiber axis can be insufficient, since defects and pores can arise, i.e., no fibril structure of the kind to be found in the case of lyocell fibers (high polymer orientation from processing highly concentrated solutions in an air gap). The cellulose fibers obtained are non-fibrillating (precisely because of the absent fibril structure), but lack strength. Wet strength is markedly lower than dry strength. Actualization of the present invention, utilizing a coordinated coagulation medium, for example by using glycerol and/or 1,2-propanediol, has succeeded in slowing the coagulation rate in wet-into-wet spinning to such an extent that wet strengths and dry strengths are significantly improved without boosting the tendency to fibrillate. The higher drawdowns now possible in the coagulation bath and higher stretch ratios for the fibers in a subsequent stretching bath (up to 100%, in water only 10% stretching) make possible an improved orientation of the polymer chains. In the realm of the invention, accordingly, diffusion and coagulation are retarded, which in the event of tensile stresses acting on the fibers at the same time permits higher polymer orientations and therefore leads to higher strengths. This greater flexibility in the process parameters is therefore directly reflected in improved fiber properties. The flexibility of the process according to the invention goes so far that for the first time a heating duct in which the fibers or filaments are stretched contactlessly can be used in a spinning process in lieu of a stretching bath.

The parameters described above, which in their totality or preferably comprise the teaching of the invention, enable a person skilled in the art to use, without problems, suitable prior art appliances to achieve the purpose of the invention. Reference in this context is made for example to B. Falkai, "*Synthesefasern—Grundlagen, Technologie, Verarbeitung and Anwendung*", Verlag Chemie, Weinheim 1981, pages 87 to 137). Nonetheless, it will now be set out by way of example which appliance is suitable for practicing the process according to the invention:

In spinning operations, the solution of a highly polymeric compound in the form of a biopolymer, in particular cellulose, is conveyed by means of a spinning pump through pipework to the shape-conferring element. The shape-conferring element is a die capillary in the case of fiber production and a slot die or roll in the case of film production. In the second step, the spinning solution is forced through the die holes or slot and tapered, and also oriented to some extent, by the withdrawal. In wet spinning according to the invention, a diffusion-controlled solvent exchange brings about the coagulation of the biopolymer dissolved in the spinning solution to form, for example, fibers or films. The solidified fibers are captured for example by rotating members (godets) and withdrawn from the die. The extrusion rate of the spinning solution is determined by the ratio of the extrudate volume per unit time to the inner cross section of the spinneret die, i.e., to the total area of all orifices. Fiber formation here takes place directly after exit from the die, through diffusion and coagulation processes. Adequate coagulation requires sufficient contact time on the part of the filaments, which is determined by the so-called coagulation length. The coagulation length is the time span which concludes with coagulation being completed. This coagulation length therefore depends on the time required for the diffusion processes and on the ratio of withdrawal speed to extrusion speed. Withdrawal speed depends on the desired fiber linear density, the pumped rate, the spinning material and on the composition of the coagulation bath.

An advantageous further development of the invention, as shown, consists in the shaped articles, which are withdrawn from the coagulation medium according to the invention, in particular the fibers, being subjected to a stretching operation in a subsequent step. Stretching can take place in a stretching bath for example. To favor the stretching operation, it is advantageous when the solvent used for the biopolymer is not completely removed in the coagulation medium, so that further stretching and further enhancement of the polymer orientation is made possible in the subsequent stretching bath. A heating duct can be used in lieu of the stretching bath. A heating duct can be for example an elongate tube through which the fiber or film to be stretched is led, the atmosphere in the tube having been set to an elevated temperature. The stretching temperature in the heating duct is optimally set as a function of the particular material. In the majority of cases, this temperature is in particular between about 120° C. and 180° C. The stretch ratios are preferably set between 5 and 200%, more particularly between 10 and 120%. As the examples which follow show, fiber properties can thereby be set specifically. Low stretch ratios give fibers of high extensibility and high stretch ratios give fibers of high strength. The residence time in the different stretching assemblies is preferably 1 to 60 seconds and depends on the length of the stretching assemblies and on the predetermined spinning speed, which is preferably 6 to 20 m/min. The length of the stretching assemblies is not critical, it is more particularly between 10 cm and 6 m.

Washing can be carried out between the coagulation and stretching measures. Stretching is generally followed by washing. The washing operation is effected using industrially established methods, for example in washing troughs with rotating rolls, winches or foraminous transportation belts, onto which water or other suitable wash liquors are sprayed.

The invention is to be explained in still more detail in the following with the aid of various examples. When "percent by weight" is referred to in the examples, this is intended to relate to the total weight of the final solution.

EXAMPLE 1

Preparation of a Cellulose Solution in 1-ethyl-3-methylimidazolium acetate (EMIM OAc) in Laboratory Mixer 900 g of 1-ethyl-3-methylimidazolium acetate (EMIM OAc) are initially introduced into a laboratory mixer, thermostatically controlled at 90° C. (dissolving temperature) in a circulating air oven and 100 g of cellulose (cotton linters DP600) are added. Mixing is carried out on level 2 for 1 min and the mixture is kept at 90° C. in the circulating air oven for 45 min. Thereafter, mixing is carried out on level 2 again and the mixture is temperature-controlled at 90° C. for a further 45 min.

The cellulose solution is filtered in a pressure-suction filter (15 μm filter fabric). The solution is stored at room temperature.

EXAMPLE 2

Fiber Production in Glycerol (Surface Tension σ in Accordance with the Invention's Definition: 90.5%)

Solution of Example 1 was processed using a conventional wet-spinning assembly. The spinning assembly is assembled from the following modules: solution container, spinning pump, filter, spinneret die, coagulation bath, stretching bath, washing bath, drying godets, winder. The essential process parameters are shown in the following table I:

TABLE I

| Die | 100 holes/60 μm |
|---|---|
| Spinning temperature | 80° C. |
| Coagulation medium | glycerol (80° C.) |
| Stretching bath | glycerol (80° C.) |
| Washing medium | water (60° C.) |

Varying the process parameters of drawdown and stretch ratio resulted in the following fiber properties:

TABLE II

| | | | | |
|---|---|---|---|---|
| Stretch ratio | 30% | 30% | 70% | 70% |
| Drawdown | −50% | 0 | −50% | 0 |
| Fineness [dtex] (individual filament) | 1.75 | 1.75 | 1.25 | 1.25 |
| Maximum tensile force (dry) [cN/tex] | 17.5 | 18.4 | 19.8 | 25.4 |
| Dry breaking elongation [%] | 9 | 8 | 8 | 7 |

TABLE II-continued

| | | | | |
|---|---|---|---|---|
| Maximum tensile force (wet) [cN/tex] | 16.8 | 17.4 | 18.2 | 24.3 |
| Wet breaking elongation [%] | 10 | 9 | 8 | 8 |

EXAMPLE 3

Fiber Production in 1,4-butanediol (Surface Tension σ in Accordance with Invention Definition: 61.4%)

The cellulose solution of Example 1 was processed according to Example 2. 1,4-Butanediol was used in lieu of glycerol. Varying the process parameters of drawdown and stretch ratio resulted in the following fiber properties:

TABLE III

| | | | | |
|---|---|---|---|---|
| Stretch ratio | 30% | 30% | 70% | 70% |
| Drawdown | −50% | 0 | −50% | 0 |
| Fineness [dtex] (individual filament) | 1.8 | 1.8 | 1.3 | 1.35 |
| Maximum tensile force (dry) [cN/tex] | 18.2 | 19.3 | 21.9 | 24.6 |
| Dry breaking elongation [%] | 10 | 8 | 7 | 6.5 |
| Maximum tensile force (wet) [cN/tex] | 18.1 | 18.2 | 19.5 | 23.2 |
| Wet breaking elongation [%] | 11.5 | 10 | 8 | 8.5 |

EXAMPLE 4

Fiber Production in 1,2-propanediol (Surface Tension σ in Accordance with Invention Definition: 48.7%)

The cellulose solution of Example 1 was processed according to Example 2. 1,2-Propanediol was used in lieu of glycerol. Varying the process parameters of drawdown and stretch ratio resulted in the following fiber properties:

TABLE IV

| | | | | |
|---|---|---|---|---|
| Stretch ratio | 30% | 30% | 70% | 70% |
| Drawdown | −50% | 0 | −50% | 0 |
| Fineness [dtex] (individual filament) | 2.1 | 2.0 | 1.45 | 1.5 |
| Maximum tensile force (dry) [cN/tex] | 16.3 | 18.2 | 18.9 | 23.6 |
| Dry breaking elongation [%] | 11 | 9 | 7.5 | 5.5 |
| Maximum tensile force (wet) [cN/tex] | 15.1 | 17.6 | 18.4 | 22.0 |
| Wet breaking elongation [%] | 12.5 | 10 | 8 | 7.5 |

EXAMPLE 5

Fiber Production in Mixture of 50% by Weight of Glycerol and 50% by Weight of 1,2-propanediol The cellulose solution of Example 1 was processed according to Example 2. A mixture of 50% by weight of glycerol and 50% by weight of 1,2-propanediol was used as coagulation medium and stretching bath solution. Varying the process parameters of drawdown and stretch ratio resulted in the following fiber properties:

TABLE V

| | | |
|---|---|---|
| Stretch ratio | 70% | 70% |
| Drawdown | −50% | 0 |
| Fineness [dtex] (individual filament) | 1.65 | 1.7 |
| Maximum tensile force (dry) [cN/tex] | 20.6 | 21.5 |
| Dry breaking elongation [%] | 6 | 4.5 |
| Maximum tensile force (wet) [cN/tex] | 19.3 | 20.8 |
| Wet breaking elongation [%] | 7 | 5 |

EXAMPLE 6

Fiber Production in Mixture of 20% by Weight of ethyl-3-methylimidazolium acetate and 80% by Weight of 1,2-propanediol The cellulose solution of Example 1 was processed according to Example 2. A mixture of 20% by weight of 1-ethyl-3-methylimidazolium acetate and 80% by weight of 1,2-propanediol was used as coagulation medium and stretching bath solution. Varying the process parameters of drawdown and stretch ratio resulted in the following fiber properties:

TABLE VI

| | | |
|---|---|---|
| Stretch ratio | 70% | 70% |
| Drawdown | −50% | 0 |
| Fineness [dtex] (individual filament) | 2.1 | 2.3 |
| Maximum tensile force (dry) [cN/tex] | 17.3 | 18.4 |
| Dry breaking elongation [%] | 8 | 7.5 |
| Maximum tensile force (wet) [cN/tex] | 17.2 | 17.9 |
| Wet breaking elongation [%] | 9 | 9.5 |

EXAMPLE 7

Fiber Production in Glycerol with Stretching in Heating Duct

Solution of Example 1 was processed using a conventional wet-spinning assembly. The spinning assembly is assembled from the following modules: solution container, spinning pump, filter, spinneret die, coagulation bath, heating duct (200 cm), washing bath, drying godets, winder. The essential process parameters are shown in the following table:

TABLE VII

| | |
|---|---|
| Die | 100 holes/60 μm |
| Spinning temperature | 80° C. |
| Coagulation medium | glycerol (80° C.) |
| Heating duct | (120° C.) |
| Washing medium | water (60° C.) |

Varying the process parameters of drawdown and stretch ratio resulted in the following fiber properties:

TABLE VIII

| | | | | |
|---|---|---|---|---|
| Stretch ratio | 20% | 20% | 100% | 100% |
| Drawdown | −50% | 0 | −50% | 0 |
| Fineness [dtex] (individual filament) | 2.7 | 2.85 | 1.55 | 1.6 |
| Maximum tensile force (dry) [cN/tex] | 14.3 | 15.2 | 21.9 | 23.8 |

TABLE VIII-continued

| Dry breaking elongation [%] | 10.5 | 9.5 | 4.5 | 4 |
|---|---|---|---|---|
| Maximum tensile force (wet) [cN/tex] | 13.8 | 14.9 | 21.8 | 23.4 |
| Wet breaking elongation [%] | 14 | 11 | 5 | 4.5 |

EXAMPLE 8

Preparation of a Cellulose Solution in 1-ethyl-3-methylimidazolium chloride (EMIM-Cl) in a Stirred Vessel 900 g of 1-ethyl-3-methylimidazolium chloride are heated to 80° C. in a double-walled, thermostatically controllable reaction vessel with a blade stirrer, stirrer motor and reflux condenser and 100 g of cellulose (cotton linters DP599) are added with stirring in the course of 15 min. Thereafter, the mixture is stirred at 80° C. for 2 h. The cellulose solution is filtered in a pressure-suction filter (15 μm filter fabric). The solution is stored at room temperature.

EXAMPLE 9

Fiber Production in Glycerol with Stretching in Heating Duct

The cellulose solution of Example 8 was processed according to Example 7. Glycerol was used as coagulation medium. Varying the process parameters of drawdown and stretch ratio resulted in the following fiber properties:

TABLE IX

| Stretch ratio | 20% | 100% |
|---|---|---|
| Drawdown | 0 | 0 |
| Fineness [dtex] (individual filament) | 2.6 | 1.4 |
| Maximum tensile force (dry) [cN/tex] | 17.6 | 22.8 |
| Dry breaking elongation [%] | 8 | 6 |
| Maximum tensile force (wet) [cN/tex] | 16.8 | 22.4 |
| Wet breaking elongation [%] | 9 | 6 |

EXAMPLE 10

Production of a Cellulose Solution in 1,3-diethylimidazolium acetate (DEIM-OAc) in Stirred Vessel In a double-walled, thermostatically controllable reaction vessel equipped with blade stirrer, stirrer motor and reflux condenser, 900 g of 1,3-diethylimidazolium acetate are heated to 80° C. and admixed with 100 g of cellulose (DP599 cotton linters) added over 15 min with stirring. This is followed by 2 h of stirring at 80° C. The cellulose solution is filtered in a pressure-suction filter (15 μm filter fabric). The solution is stored at room temperature.

EXAMPLE 11

Fiber Production in Glycerol with Stretching in Heating Duct

The cellulose solution of Example 10 was processed according to Example 7. Glycerol was used as coagulation medium. Varying the process parameters of drawdown and stretch ratio resulted in the following fiber properties:

TABLE X

| Stretch ratio | 20% | 100% |
|---|---|---|
| Drawdown | 0 | 0 |
| Fineness [dtex] (individual filament) | 2.8 | 1.65 |
| Maximum tensile force (dry) [cN/tex] | 18.6 | 21.2 |
| Dry breaking elongation [%] | 9 | 7 |
| Maximum tensile force (wet) [cN/tex] | 18.2 | 20.8 |
| Wet breaking elongation [%] | 10 | 9 |

TABLE XI

Categories of protic solvents

| | Sigma 50° C. [N/m] | Positive list Sigma 50° C. relative to water [%] | Negative list Sigma 50° C. relative to water [%] |
|---|---|---|---|
| a) Reference | | | |
| Water | 0.067888 | — | — |
| b) Primary unbranched alcohols (melting point <40° C.) | | | |
| Methanol | 0.020016 | — | 29.5% |
| Ethanol | 0.019913 | — | 29.3% |
| Propan-1-ol | 0.021431 | 31.6% | — |
| Butan-1-ol | 0.022391 | 33.0% | — |
| Pentan-1-ol | 0.023134 | 34.1% | — |
| Hexan-1-ol | 0.02379 | 35.0% | — |
| Heptan-1-ol | 0.024451 | 36.0% | — |
| Octan-1-ol | 0.025096 | 37.0% | — |
| Nonan-1-ol | 0.02573 | 37.9% | — |
| Decan-1-ol | 0.02636 | 38.8% | — |
| Undecan-1-ol | 0.026806 | 39.5% | — |
| Dodecan-1-ol | 0.027495 | 40.5% | — |
| Tridecan-1-ol | 0.028704 | 42.3% | — |
| Tetradecan-1-ol | 0.028464 | 41.9% | — |
| c) Primary branched alcohols (melting point <40° C.) | | | |
| Propan-2-ol | 0.019001 | — | 28.0% |
| Butan-2-ol | 0.020973 | 30.9% | — |
| 2-Methylpropan-1-ol (Isobutanol) | 0.020604 | 30.3% | — |
| 2-Methylpropan-2-ol (t-Butanol) | 0.017702 | — | 26.1% |
| Pentan-2-ol | 0.0213 | 31.4% | — |
| Pentan-3-ol | 0.021614 | 31.8% | — |
| 2-Methylbutan-1-ol | 0.021905 | 32.3% | — |
| 3-Methylbutan-1-ol (Isopentanol) | 0.021749 | 32.0% | — |
| 2-Methylbutan-2-ol | 0.02041 | 30.1% | — |
| 3-Methylbutan-2-ol | 0.02057 | 30.3% | — |
| 2,2-Dimethylpropan-1-ol | 0.015298 | — | 22.5% |
| 2-Ethylhexan-1-ol | 0.023983 | 35.3% | — |
| d) Polyhydric alcohols (melting point <40° C.) | | | |
| Ethane-1,2-diol | 0.045756 | 67.4% | — |
| Propane-1,2-diol | 0.033029 | 48.7% | — |
| Propane-1,3-diol | 0.043207 | 63.6% | — |
| Butane-1,2-diol | 0.0327 | 48.2% | — |
| Butane-1,3-diol | 0.035149 | 51.8% | — |
| Butane-1,4-diol | 0.041668 | 61.4% | — |
| Pentane-1,5-diol | 0.040773 | 60.1% | — |
| Hexane-1,6-diol | 0.040838 | 60.2% | — |
| Propane-1,2,3-triol | 0.061411 | 90.5% | — |

TABLE XI-continued

| | Sigma 50° C. [N/m] | Sigma 50° C. relative to water [%] | |
|---|---|---|---|
| 2,2-Dimethylpropane-1,5-diol | 0.026227 | 38.6% | — |
| e) Other alcohols (melting point <40° C.) | | | |
| Cyclohexanol | 0.03077 | 45.3% | — |
| Diethylene glycol | 0.045933 | 67.7% | — |
| Triethylene glycol | 0.042887 | 63.2% | — |
| Prop-2-en-1-ol | 0.023041 | 33.9% | — |
| f) Primary and secondary amines (melting point <40° C., boiling point <160° C.) | | | |
| Diethanolamine | 0.046285 | 68.2% | — |
| Monoethanolamine | 0.045582 | 67.1% | — |
| 1,2-Propylenediamine | 0.028034 | 41.3% | — |
| Butylamine | 0.020609 | 30.4% | — |
| Dibutylamine | 0.021779 | 32.1% | — |
| Dipropylamine | 0.019663 | — | 29.0% |
| Hexylamine | 0.022881 | 33.7% | — |
| N,N-Dimethylethanolamine | 0.025458 | 37.5% | — |
| 1,3-Diaminopropane | 0.031702 | 46.7% | — |
| Diethylethanolamine | 0.024927 | 36.7% | — |
| Methyldiethanolamine | 0.03828 | 56.4% | — |
| N-Methylethanolamine | 0.032038 | 47.2% | — |
| g) Carboxylic acids and derivatives | | | |
| Acetic acid | 0.024573 | 36.2% | — |
| Propionic acid | 0.023695 | 34.9% | — |
| Formamide | 0.055383 | 81.6% | — |
| Formic acid | 0.03449 | 50.8% | — |
| h) Aqueous carboxylic acid solutions | | | |
| Formic acid/water (90/10 wt %) | 0.04187 | 61.7% | — |
| Formic acid/water (50/50 wt %) | 0.05849 | 86.2% | — |
| Formic acid/water (10/90 wt %) | 0.06649 | 97.9% | — |
| Acetic acid/water (90/10 wt %) | 0.03628 | 53.4% | — |
| Acetic acid/water (50/50 wt %) | 0.05789 | 85.3% | — |
| Acetic acid/water (10/90 wt %) | 0.06649 | 97.9% | — |
| Propionic acid/water (90/10 wt %) | 0.03755 | 55.3% | — |
| Propionic acid/water (50/50 wt %) | 0.05924 | 87.3% | — |
| Propionic acid/water (10/90 wt %) | 0.06672 | 98.3% | — |
| Formic acid/water (5/95 wt %) | 0.0672 | 99.0% | — |
| Sulfuric acid/water (10/90 wt %) | 0.06756 | — | 99.5% |
| Phosphoric acid/water (10/90 wt %) | 0.06736 | — | 99.2% |
| Hydrochloric acid/water (10/90 wt %) | 0.06715 | 98.9% | — |

| Nonprotic solvents (negative list only) | | |
|---|---|---|
| | Sigma 50° C. [N/m] | Sigma 50° C. relative to water [%] |
| a) Reference | | |
| Water | 0.067888 | 100.0% |
| b) Nonprotic solvents | | |
| Acetonitrile | 0.0255 | 37.6% |
| Acetone | 0.020068 | 29.6% |
| N-Methylpyrrolidone | 0.039154 | 57.7% |
| N,N-Dimethylformamide | 0.031746 | 46.8% |
| N,N-Dimethylacetamide | 0.029685 | 43.7% |
| 1,4-Dioxane | 0.029289 | 43.1% |
| 1,3,5-Trioxane | 0.037973 | 55.9% |
| THF | 0.023424 | 34.5% |
| Dichloromethane | 0.023161 | 34.1% |
| c) Mixtures of nonprotic/protic solvents | | |
| Acetone/water (90/10 wt %) | 0.06629 | 97.6% |
| Acetone/water (50/50 wt %) | 0.05654 | 83.3% |
| Acetone/water (10/90 wt %) | 0.03262 | 48.0% |

The invention claimed is:

1. A process for preparing a regenerated biopolymer comprising dissolving a biopolymer in a solution system comprising at least one molten ionic liquid and optionally at least one protic solvent, and precipitating the biopolymers in a coagulation medium optionally comprising water, a protic coagulation agent or a mixture of protic coagulation agents being present in the coagulation medium,
   wherein the protic coagulation agent is selected from the group consisting of ethane-1,2-diol, propane-1,2,3-triol, diethylene glycol, triethylene glycol, 1,4-butanediol, 1,2-propanediol, 1,3-propanediol, 1,6-hexanediol, and mixtures thereof, and
   wherein the coagulation medium does not contain more than 5% of carboxylic acid.

2. The process as claimed in claim 1 wherein the protic coagulation agent is selected from the group consisting of 1,4-butanediol, 1,2-propanediol, 1,3-propanediol, 1,6-hexanediol, and mixtures thereof.

3. The process as claimed in claim 1 wherein the ionic liquid comprises a cation of amidinium structure.

4. The process as claimed in claim 3, wherein the cation is a substituted or unsubstituted imidazolium cation.

5. The process as claimed in claim 4, wherein the imidazolium cation of the ionic liquid is substituted by (C1-C6)-alkyl groups in the 1- and 3-position or in the 1-, 2- and 3-position.

6. The process as claimed in claim 4, wherein the imidazolium cation is a 1-ethyl-3-methylimidazolium, a 1,3-dimethylimidazolium cation, a 1,3-diethylimidazolium cation or a 1-butyl-3-methylimidazolium cation.

7. The process as claimed in claim 1, wherein the anion of the ionic liquid is a halide, a perchlorate, a pseudohalide, a sulfate, a phosphate, an alkyl-phosphate or, a C1-C6-carboxylate ion.

8. The process as claimed in claim 7, wherein the halide ion is present as a chloride, a bromide and/or an iodide ion, the pseudohalide ion is present as a cyanide, a thiocyanate and/or a cyanate ion and the C1-C6-carboxylate ion is present as formate, acetate, propionate, butyrate, hexanoate, maleate, fumarate, oxalate, lactate and/or pyruvate ion.

9. The process as claimed in claim 1, wherein the molten ionic liquid has a melting point of from −100 to +150° C.

10. The process as claimed in claim 1, wherein the ionic liquid comprises at least one selected from the group consisting of 1-ethyl-3-methylimidazolium acetate, 1,3-dimethylimidazolium acetate, 1-ethyl-3-methylimidazolium chloride, 1-butyl-3-methylimidazolium acetate, 1-ethyl-3-methylimidazolium diethyl-phosphate, 1-methyl-3-methylimidazolium dimethyl-phosphate, 1-ethyl-3-methylimidazolium formate, 1-ethyl-3-methylimidazolium octanoate, 1,3-diethylimidazolium acetate, 1,3-diethylimidazolium chloride and 1-ethyl-3-methylimidazolium propionate.

11. The process as claimed in claim 1, wherein the solution system has a zero viscosity, measured with a rotary viscometer, of between 5 and 150,000 Pa·s.

12. The process as claimed in claim 1, further comprising degassing the solution system comprising the biopolymer before precipitating the biopolymers in the coagulation medium.

13. The process as claimed in claim 12, wherein the degassing of the solution system is carried out under a vacuum.

14. The process as claimed in claim 1, further comprising filtering the solution system comprising the biopolymer.

15. The process as claimed in claim 1, further comprising wet spinning the solution system comprising the biopolymer.

16. The process as claimed in claim 15, wherein the wet spinning process is configured such that either a continuous filament or a staple fiber is formed.

17. The process as claimed in claim 1, wherein the solution system comprising the biopolymer is a spinning solution for the production of a non-fibrillating fiber.

18. The process as claimed in claim 1, further comprising adjusting specific properties of a precipitated material obtained by adding an additive to the coagulation medium, the solution system and/or a subsequent modification bath, in solution or fine dispersion.

19. The process as claimed in claim 18, wherein the additive is in the form of a microcapsule, a pore-forming agent, a plasticizer, a matting agent, a flameproofing agent, a bactericide, a crosslinking agent, a hydrophobizing agent, an antistatic and/or a coloring agent.

20. The process as claimed in claim 1 wherein the protic coagulation agent in the coagulation medium is selected from the group consisting of propane-1,2,3-triol, 1,4-butanediol, 1,2-propanediol, and mixtures thereof.

21. The process as claimed in claim 1 wherein the protic coagulation agent in the coagulation medium is present in an amount of from 30% to 100% by weight.

22. The process as claimed in claim 1, further comprising adjusting the temperature of the solution system comprising a biopolymer to a temperature of more than about 0° C., before processing and/or adjusting the temperature of the coagulation medium to a temperature of more than about 20° C.

23. The process as claimed in claim 22, further comprising heating the solution system comprising the biopolymer before the processing to a temperature of about 20 to 140° C., and/or adjusting the temperature of the coagulation medium to a temperature of from about 40 to 90° C.

24. The process as claimed in claim 1, further comprising precipitating out the biopolymer in the coagulation medium, and separating the precipitated biopolymer from the coagulation medium.

25. The process as claimed in claim 1, further comprising withdrawing a fiber or a filament from the coagulation medium and stretching the fiber or filament in a subsequent stretching bath or in a subsequent heating duct.

26. The process as claimed in claim 25, wherein the fiber or filament is stretched to at least 10%.

27. The process as claimed in claim 26, wherein the fibers or filaments is stretched to at least 70%.

28. The process as claimed in claim 25, wherein the stretching bath is based on a solvent, which as coagulation agent is part of the coagulation medium, in the form of propane-1,2,3-triol, 1,4-butanediol, 1,2-propanediol, and mixtures thereof.

29. The process as claimed in claim 25, further comprising washing the fiber or filament withdrawn from the coagulation medium and/or the stretching bath.

30. The process as claimed in claim 25, further comprising collecting the ionic liquid in the stretching bath and recovering the ionic liquid.

31. The process as claimed in claim 25, wherein the coagulation medium comprises water.

32. The process of claim 1, wherein the regenerated biopolymer is in the form of a carbohydrate.

33. The process as claimed in claim 32, wherein cellulose or derivative thereof dissolved in the solution system has an average degree of polymerization of from 200 to 3,500.

34. The process of claim 32, wherein the carbohydrate is starch, cellulose, and/or derivatives of starch and/or cellulose.

35. The process as claimed in claim 34, wherein the carbohydrate is an ester or ether of starch and/or cellulose.

36. The process as claimed in claim 34, wherein the starch, cellulose and/or derivative thereof is present in the solution system in an amount of more than about 1 wt. %.

37. The process as claimed in claim 34, wherein the starch, cellulose and/or derivative thereof is present in the solution system in an amount of from 1 to 35 wt. %.

38. The process as claimed in claim 34, wherein the biopolymer in the solution system is cellulose, and the solution system comprising the cellulose has a zero viscosity of between 10 and 150,000 Pa·s, the content of cellulose being between about 5 and 30 wt. %.

39. The process as claimed in claim 1 wherein the coagulation medium comprises water.

\* \* \* \* \*